United States Patent
Hakimi-Boushehri et al.

(10) Patent No.: US 10,181,160 B1
(45) Date of Patent: *Jan. 15, 2019

(54) SYSTEMS AND METHODS FOR ASSIGNING DAMAGE CAUSED BY AN INSURANCE-RELATED EVENT

(71) Applicant: STATE FARM MUTUAL AUTOMOBILE INSURANCE COMPANY, Bloomington, IL (US)

(72) Inventors: Daryoush Hakimi-Boushehri, Bloomington, IL (US); Jackie O. Jordan, II, Bloomington, IL (US); Shawn M. Call, Bloomington, IL (US); John H. Weekes, Bloomington, IL (US); Ronny S. Bryant, Bloomington, IL (US); Jennifer Criswell, Bloomington, IL (US); Todd Binion, Bloomington, IL (US); Elisabeth McDermeit, Bloomington, IL (US); John Donovan, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 332 days.

This patent is subject to a terminal disclaimer.

(21) Appl. No.: 14/693,039

(22) Filed: Apr. 22, 2015

Related U.S. Application Data

(60) Provisional application No. 62/073,695, filed on Oct. 31, 2014, provisional application No. 62/061,018, (Continued)

(51) Int. Cl.
*G06Q 40/08* (2012.01)
*G06Q 50/16* (2012.01)

(52) U.S. Cl.
CPC .......... *G06Q 40/08* (2013.01); *G06Q 50/16* (2013.01)

(58) Field of Classification Search
CPC .... G06Q 40/08; G06Q 10/0635; G06Q 10/20; G06Q 50/16; G06Q 50/06;
(Continued)

(56) References Cited

U.S. PATENT DOCUMENTS 3,817,161 A 6/1974 Koplon
3,875,612 A 4/1975 Poitras
(Continued)

FOREIGN PATENT DOCUMENTS

| CN | 202865924 U | 4/2013 |
|---|---|---|
| WO | WO-2013/076721 A1 | 5/2013 |
| WO | WO-2014/207558 A2 | 12/2014 |

OTHER PUBLICATIONS

U.S. Appl. No. 14/692,864, Nonfinal Office Action, dated May 16, 2017.
(Continued)

*Primary Examiner* — Mohammad Z Shaikh
(74) *Attorney, Agent, or Firm* — Marshall, Gerstein & Borun LLP; Randall G. Rueth

(57) ABSTRACT

Methods and systems for assigning damage to a property to causes of loss are provided. A smart home controller and/or an insurance provider remote processor (or server) may generate a time sequence of events for damage associated with an insure-related event. The time-sequence of events may be analyzed to identify causes of loss associated with damage to the property. The smart home controller or insurance provider remote processor may further analyze the time-sequence of event to determine a portion of the overall damage associated with each cause of loss. Subsequently, according to certain aspects, the smart home controller or (Continued)

insurance provider remote processor may automatically generate a prepopulated insurance claim for damage associated with the insurance-related event, and/or transmit the automatically prepared insurance claim to an insured for their review, approval, and/or modification, such as via wireless communication to a mobile device associated with the insured.

18 Claims, 8 Drawing Sheets

Related U.S. Application Data filed on Oct. 7, 2014, provisional application No. 62/060,847, filed on Oct. 7, 2014, provisional application No. 62/061,007, filed on Oct. 7, 2014, provisional application No. 62/061,016, filed on Oct. 7, 2014, provisional application No. 62/060,808, filed on Oct. 7, 2014, provisional application No. 62/061,000, filed on Oct. 7, 2014, provisional application No. 62/061,003, filed on Oct. 7, 2014, provisional application No. 62/061,012, filed on Oct. 7, 2014, provisional application No. 62/061,009, filed on Oct. 7, 2014, provisional application No. 62/060,777, filed on Oct. 7, 2014, provisional application No. 62/012,008, filed on Jun. 13, 2014, provisional application No. 61/984,541, filed on Apr. 25, 2014.

(58) Field of Classification Search
 CPC ........ H04L 12/2803; H04L 2012/2841; H04N 7/181; G08B 29/04; G08B 21/10; Y02B 20/48
 See application file for complete search history.

(56) References Cited

U.S. PATENT DOCUMENTS

| | | | |
|---|---|---|---|
| 5,099,751 A | 3/1992 | Newman et al. | |
| 5,128,859 A | 7/1992 | Carbone et al. | |
| 5,554,433 A | 9/1996 | Perrone, Jr. et al. | |
| 5,903,426 A | 5/1999 | Ehling | |
| 6,023,762 A | 2/2000 | Dean et al. | |
| 6,155,324 A | 12/2000 | Elliott et al. | |
| 6,222,455 B1 | 4/2001 | Kaiser | |
| 6,526,807 B1 | 3/2003 | Doumit et al. | |
| 6,812,848 B2 | 11/2004 | Candela | |
| 7,030,767 B2 | 4/2006 | Candela | |
| 7,194,416 B1 | 3/2007 | Provost et al. | |
| 7,309,216 B1 | 12/2007 | Spadola, Jr. et al. | |
| 7,348,882 B2 | 3/2008 | Adamczyk et al. | |
| 7,598,856 B1 | 10/2009 | Nick et al. | |
| 7,715,036 B2 | 5/2010 | Silverbrook et al. | |
| 7,809,587 B2 | 10/2010 | Dorai et al. | |
| 7,813,822 B1 | 10/2010 | Hoffberg | |
| 8,031,079 B2 | 10/2011 | Kates | |
| 8,041,636 B1* | 10/2011 | Hunter | G06Q 20/10 705/26.1 |
| 8,106,769 B1* | 1/2012 | Maroney | G06Q 10/10 340/540 |
| 8,108,271 B1 | 1/2012 | Duncan et al. | |
| 8,229,861 B1 | 7/2012 | Trandal et al. | |
| 8,280,633 B1* | 10/2012 | Eldering | G01W 1/10 702/3 |
| 8,289,160 B1* | 10/2012 | Billman | G08B 21/18 340/540 |
| 8,316,237 B1 | 11/2012 | Felsher et al. | |
| 8,400,299 B1 | 3/2013 | Maroney et al. | |
| 8,510,196 B1* | 8/2013 | Brandmaier | G06Q 40/08 705/35 |
| 8,527,306 B1* | 9/2013 | Reeser | G06Q 40/08 705/4 |
| 8,533,144 B1 | 9/2013 | Reeser et al. | |
| 8,595,034 B2 | 11/2013 | Bauer et al. | |
| 8,596,293 B2 | 12/2013 | Mous et al. | |
| 8,605,209 B2 | 12/2013 | Becker | |
| 8,620,841 B1 | 12/2013 | Filson et al. | |
| 8,621,097 B2 | 12/2013 | Venkatakrishnan et al. | |
| 8,650,048 B1* | 2/2014 | Hopkins, III | G06Q 40/08 705/4 |
| 8,694,501 B1 | 4/2014 | Trandal et al. | |
| 8,712,893 B1* | 4/2014 | Brandmaier | G06F 17/3028 705/35 |
| 8,730,039 B1 | 5/2014 | Billman | |
| 8,731,975 B2 | 5/2014 | English et al. | |
| 8,749,381 B1* | 6/2014 | Maroney | G06Q 10/10 340/540 |
| 9,049,168 B2* | 6/2015 | Jacob | H04L 12/2803 709/206 |
| 9,280,252 B1 | 3/2016 | Brandmaier et al. | |
| 9,297,150 B2* | 3/2016 | Klicpera | E03B 7/071 |
| 9,424,606 B2* | 8/2016 | Wilson, II | G06Q 40/08 |
| 9,429,925 B2* | 8/2016 | Wait | G05B 15/02 |
| 9,652,976 B2* | 5/2017 | Bruck | G01N 27/02 |
| 9,654,434 B2* | 5/2017 | Sone | H04L 51/16 |
| 9,665,892 B1* | 5/2017 | Reeser | G06Q 30/04 |
| 9,666,060 B2* | 5/2017 | Reeser | G06Q 30/04 |
| 9,710,858 B1* | 7/2017 | Devereaux | G06Q 40/08 |
| 9,727,921 B2* | 8/2017 | Cook | G06Q 40/08 |
| 9,824,397 B1* | 11/2017 | Patel | G06Q 40/08 |
| 9,882,985 B1* | 1/2018 | Esam | H04L 67/1097 |
| 9,892,463 B1* | 2/2018 | Hakimi-Boushehri | G06Q 40/08 |
| 9,898,912 B1 | 2/2018 | Jordan, II et al. | |
| 9,947,051 B1* | 4/2018 | Allen | G06Q 40/08 |
| 9,947,202 B1* | 4/2018 | Moon | G06Q 50/265 |
| 10,005,793 B2* | 6/2018 | Mazitschek | C07F 5/025 |
| 10,042,341 B1* | 8/2018 | Jacob | G06N 5/04 |
| 2002/0040306 A1 | 4/2002 | Sugiyama et al. | |
| 2003/0025599 A1 | 2/2003 | Monroe | |
| 2004/0054789 A1 | 3/2004 | Breh et al. | |
| 2004/0177032 A1 | 9/2004 | Bradley et al. | |
| 2004/0211228 A1 | 10/2004 | Nishio et al. | |
| 2005/0030175 A1 | 2/2005 | Wolfe | |
| 2005/0080520 A1 | 4/2005 | Kline et al. | |
| 2005/0139420 A1 | 6/2005 | Spoltore et al. | |
| 2005/0251427 A1 | 11/2005 | Dorai et al. | |
| 2005/0275527 A1 | 12/2005 | Kates | |
| 2006/0033625 A1 | 2/2006 | Johnson et al. | |
| 2006/0100912 A1 | 5/2006 | Kumar et al. | |
| 2006/0154642 A1 | 7/2006 | Scannell | |
| 2006/0184379 A1 | 8/2006 | Tan et al. | |
| 2008/0018474 A1 | 1/2008 | Bergman et al. | |
| 2008/0019392 A1 | 1/2008 | Lee | |
| 2008/0065427 A1* | 3/2008 | Helitzer | G06Q 40/08 705/4 |
| 2008/0184272 A1* | 7/2008 | Brownewell | G06Q 10/10 719/318 |
| 2008/0285797 A1 | 11/2008 | Hammadou | |
| 2009/0001891 A1 | 1/2009 | Patterson | |
| 2009/0044595 A1* | 2/2009 | Vokey | G01M 3/165 73/1.17 |
| 2009/0094129 A1 | 4/2009 | Rhodes et al. | |
| 2009/0243852 A1* | 10/2009 | Haupt | G01W 1/00 340/541 |
| 2009/0259581 A1 | 10/2009 | Horowitz et al. | |
| 2009/0265193 A1* | 10/2009 | Collins | G06Q 30/0185 705/4 |
| 2010/0025349 A1 | 2/2010 | Khoshnevis | |
| 2010/0073840 A1 | 3/2010 | Hennessey, Jr. | |
| 2010/0235285 A1 | 9/2010 | Hoffberg | |
| 2010/0299217 A1 | 11/2010 | Hui | |
| 2011/0003577 A1* | 1/2011 | Rogalski | H04M 1/2725 455/404.1 |
| 2011/0077875 A1 | 3/2011 | Tran et al. | |
| 2011/0112660 A1 | 5/2011 | Bergmann et al. | |
| 2011/0161117 A1 | 6/2011 | Busque et al. | |
| 2012/0016695 A1* | 1/2012 | Bernard | G06Q 40/08 705/4 |
| 2012/0101855 A1 | 4/2012 | Collins et al. | |

(56) References Cited

U.S. PATENT DOCUMENTS

| | | | |
|---|---|---|---|
| 2012/0116820 A1 | 5/2012 | English et al. | |
| 2012/0166115 A1 | 6/2012 | Apostolakis | |
| 2012/0188081 A1 | 7/2012 | Van Katwijk | |
| 2012/0265586 A1 | 10/2012 | Mammone | |
| 2012/0290333 A1 | 11/2012 | Birchall | |
| 2013/0049950 A1 | 2/2013 | Wohlert | |
| 2013/0096960 A1 | 4/2013 | English et al. | |
| 2013/0144486 A1 | 6/2013 | Ricci | |
| 2013/0159021 A1 | 6/2013 | Felsher | |
| 2013/0226624 A1* | 8/2013 | Blessman | G06Q 40/08 705/4 |
| 2013/0234840 A1* | 9/2013 | Trundle | G08C 19/16 340/12.53 |
| 2013/0257626 A1 | 10/2013 | Masli et al. | |
| 2013/0290033 A1 | 10/2013 | Reeser et al. | |
| 2014/0122133 A1 | 5/2014 | Weisberg et al. | |
| 2014/0136242 A1* | 5/2014 | Weekes | G06Q 40/08 705/4 |
| 2014/0180723 A1* | 6/2014 | Cote | G06Q 40/08 705/4 |
| 2014/0201315 A1* | 7/2014 | Jacob | H04L 12/2803 709/217 |
| 2014/0201844 A1 | 7/2014 | Buck | |
| 2014/0222329 A1 | 8/2014 | Frey | |
| 2014/0222469 A1 | 8/2014 | Stahl et al. | |
| 2014/0238511 A1 | 8/2014 | Klicpera | |
| 2014/0244997 A1* | 8/2014 | Goel | H04W 12/08 713/155 |
| 2014/0257862 A1* | 9/2014 | Billman | G06Q 40/08 705/4 |
| 2014/0266717 A1 | 9/2014 | Warren et al. | |
| 2014/0278571 A1 | 9/2014 | Mullen et al. | |
| 2014/0303801 A1 | 10/2014 | Ahn et al. | |
| 2014/0340216 A1* | 11/2014 | Puskarich | G08B 17/11 340/539.11 |
| 2014/0358592 A1* | 12/2014 | Wedig | G06Q 40/08 705/4 |
| 2014/0379156 A1 | 12/2014 | Kamel et al. | |
| 2015/0061859 A1* | 3/2015 | Matsuoka | G08B 27/00 340/501 |
| 2015/0116107 A1* | 4/2015 | Fadell | G08B 19/005 340/501 |
| 2015/0154712 A1* | 6/2015 | Cook | G06Q 40/08 705/4 |
| 2015/0160623 A1 | 6/2015 | Holley | |
| 2015/0160636 A1 | 6/2015 | McCarthy, III et al. | |
| 2015/0163412 A1* | 6/2015 | Holley | G05B 15/02 348/143 |
| 2015/0170288 A1 | 6/2015 | Harton et al. | |
| 2015/0206249 A1 | 7/2015 | Fini | |
| 2015/0287310 A1* | 10/2015 | Deliuliis | H04W 4/90 340/628 |
| 2015/0332407 A1 | 11/2015 | Wilson, II et al. | |
| 2015/0364028 A1 | 12/2015 | Child et al. | |
| 2016/0006723 A1* | 1/2016 | Wilson | H04L 63/0823 713/175 |
| 2016/0018226 A1 | 1/2016 | Plocher et al. | |
| 2016/0042463 A1* | 2/2016 | Gillespie | G06Q 40/08 705/4 |
| 2016/0078744 A1* | 3/2016 | Gieck | G08B 17/113 340/585 |
| 2016/0104250 A1* | 4/2016 | Allen | G06Q 40/08 705/50 |
| 2017/0116676 A1* | 4/2017 | Blessman | G06Q 40/08 |
| 2017/0147722 A1 | 5/2017 | Greenwood | |
| 2017/0304659 A1 | 10/2017 | Chen et al. | |

OTHER PUBLICATIONS

U.S. Appl. No. 14/692,946, Nonfinal Office Action, dated Apr. 4, 2017.
U.S. Appl. No. 14/692,961, Nonfinal Office Action, dated Apr. 14, 2017.
U.S. Appl. No. 14/693,021, Nonfinal Office Action, dated Jun. 30, 2017.
U.S. Appl. No. 14/693,034, Nonfinal Office Action, dated May 17, 2017.
U.S. Appl. No. 14/693,057, Nonfinal Office Action, dated Aug. 21, 2017.
U.S. Appl. No. 14/873,823, Final Office Action, dated Mar. 15, 2017.
U.S. Appl. No. 14/873,823, Nonfinal Office Action, dated Jun. 21, 2017.
U.S. Appl. No. 14/873,823, Nonfinal Office Action, dated Nov. 30, 2016.
U.S. Appl. No. 14/873,864, Final Office Action, dated Dec. 2, 2016.
U.S. Appl. No. 14/692,943, Nonfinal Office Action, dated Sep. 12, 2017.
U.S. Appl. No. 14/692,961, Final Office Action, dated Sep. 1, 2017.
U.S. Appl. No. 14/693,032, Nonfinal Office Action, dated Sep. 7, 2017.
U.S. Appl. No. 14/873,864, Notice of Allowance, dated Aug. 28, 2017.
U.S. Appl. No. 14/873,864, Nonfinal Office Action, dated Apr. 5, 2017.
U.S. Appl. No. 14/873,864, Nonfinal Office Action, dated Jul. 14, 2016.
Knutsen, Confusion about causation in insurance: solutions for catastrophic losses, Ala. L. Rev., 5:957-1023 (2010).
U.S. Appl. No. 14/692,864, Final Office Action, dated Nov. 8, 2017.
U.S. Appl. No. 14/692,946, Final Office Action, dated Oct. 30, 2017.
U.S. Appl. No. 14/692,953, Nonfinal Office Action, dated Sep. 19, 2017.
U.S. Appl. No. 14/692,961, Nonfinal Office Action, dated Dec. 28, 2017.
U.S. Appl. No. 14/693,034, Notice of Allowance, dated Oct. 25, 2017.
U.S. Appl. No. 14/873,722, Nonfinal Office Action, dated Dec. 5, 2017.
U.S. Appl. No. 14/873,783, Nonfinal Office Action, dated Dec. 8, 2017.
U.S. Appl. No. 14/873,823, Final Office Action, dated Nov. 3, 2017.
U.S. Appl. No. 14/873,864, Notice of Allowance, dated Dec. 21, 2017.
U.S. Appl. No. 14/873,914, Nonfinal Office Action, dated Dec. 26, 2017.
U.S. Appl. No. 14/873,942, Nonfinal Office Action, dated Nov. 22, 2017.
U.S. Appl. No. 14/693,021, Final Office Action, dated Jan. 25, 2018.
U.S. Appl. No. 14/873,864, Corrected Notice of Allowance, dated Jan. 18, 2018.
U.S. Appl. No. 14/693,057, Final Office Action, dated Feb. 7, 2018.
U.S. Appl. No. 14/873,864, Corrected Notice of Allowability, dated Jan. 18, 2018.
U.S. Appl. No. 14/873,823, Nonfinal Office Action, dated Feb. 23, 2018.
System for Loss Prevention, IP.com, published Nov. 8, 2008.
U.S. Appl. No. 14/692,864, Nonfinal Office Action, dated May 24, 2018.
U.S. Appl. No. 14/692,943, Notice of Allowance, dated May 1, 2018.
U.S. Appl. No. 14/692,946, Nonfinal Office Action, dated Apr. 6, 2018.
U.S. Appl. No. 14/692,953, Final Office Action, dated Apr. 27, 2018.
U.S. Appl. No. 14/692,961, Final Office Action, dated Jun. 20, 2018.
U.S. Appl. No. 14/693,032, Final Office Action, dated Mar. 22, 2018.
U.S. Appl. No. 14/693,032, Notice of Allowance, dated Jun. 22, 2018.
U.S. Appl. No. 14/873,722, Final Office Action, dated Jun. 15, 2018.
U.S. Appl. No. 14/873,783, Final Office Action, dated May 23, 2018.
U.S. Appl. No. 14/873,823, Final Office Action, dated Jun. 29, 2018.

(56) References Cited

OTHER PUBLICATIONS

U.S. Appl. No. 14/873,942, Nonfinal Office Action, dated Mar. 16, 2018.
U.S. Appl. No. 15/409,248, filed Jan. 18, 2017, Konrardy et al., "Sensor Malfunction Detection".
U.S. Appl. No. 15/409,271, filed Jan. 18, 2017, Konrardy et al., "Autonomous Vehicle Component Malfunction Impact Assessment".
U.S. Appl. No. 15/409,305, Jan. 18, 2017, Konrardy et al., "Component Malfunction Impact Assessment".
U.S. Appl. No. 15/409,318, filed Jan. 18, 2017, Konrardy et al., "Automatic Repair of Autonomous Vehicles".
U.S. Appl. No. 15/409,336, filed Jan. 18, 2017, Konrardy et al., "Automatic Repair of Autonomous Components".
U.S. Appl. No. 15/409,340, filed Jan. 18, 2017, Konrardy et al., "Autonomous Vehicle Damage and Salvage Assessment".
U.S. Appl. No. 15/409,349, filed Jan. 18, 2017, Konrardy et al., "Component Damage and Salvage Assessment".
U.S. Appl. No. 15/409,359, filed Jan. 18, 2017, Konrardy et al., "Detecting and Responding to Autonomous Vehicle Collisions".
U.S. Appl. No. 5/409,371, filed Jan. 18, 2017, Konrardy et al., "Detecting and Responding to Autonomous Environment Incidents".
U.S. Appl. No. 15/409,445, filed Jan. 18, 2017, Konrardy et al., "Virtual Testing of Autonomous Vehicle Control System".
U.S. Appl. No. 15/409,473, filed Jan. 18, 2017, Konrardy et al., "Virtual Testing of Autonomous Environment Control System".
U.S. Appl. No. 15/859,859, filed Jan. 2, 2018, Hakmi-Boushehri et al., "Systems and Methods for Community-Based Cause of Loss Determination".
U.S. Appl. No. 15/895,149, filed Feb. 13, 2018, Jordan et al., Systems and Methods for Automatically Generating an Escape Route.
U.S. Appl. No. 15/087,326, Nonfinal Office Action, dated Jun. 14, 2018.

\* cited by examiner

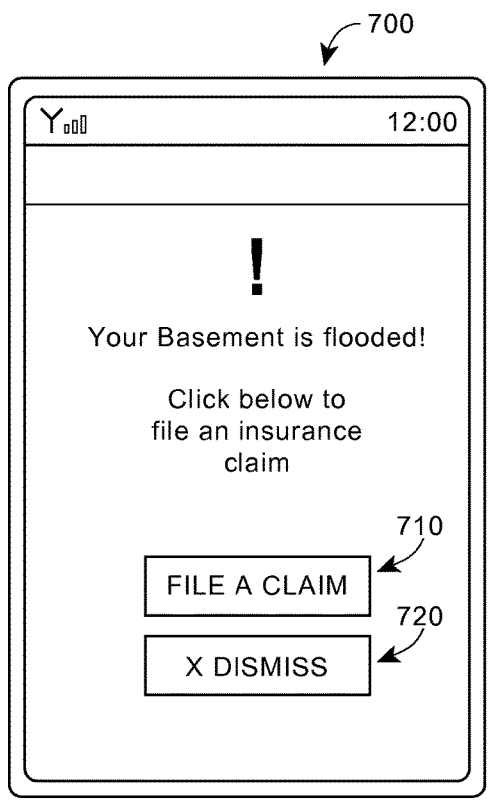 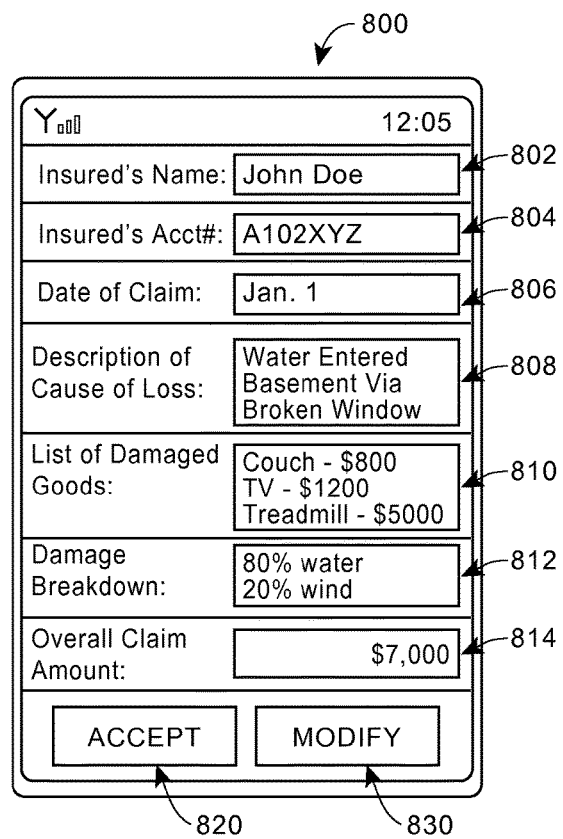
FIG. 7  FIG. 8

SYSTEMS AND METHODS FOR ASSIGNING DAMAGE CAUSED BY AN INSURANCE-RELATED EVENT

CROSS-REFERENCE TO RELATED APPLICATIONS

This application claims benefit of the filing date of U. S. Provisional Patent Application Nos. 61/984,541 (filed Apr. 25, 2014, and entitled "HOME INSURANCE AND THE PREVENTION, DETECTION, AND MITIGATION OF HOUSEHOLD DAMAGE"); 62/012,008 (filed Jun. 13, 2014, and entitled "HOME INSURANCE AND THE PREVENTION, DETECTION, AND MITIGATION OF HOUSEHOLD DAMAGE"); 62/061,000 (filed Oct. 7, 2014, and entitled "SYSTEMS AND METHODS FOR AUTOMATICALLY MITIGATING RISK OF PROPERTY DAMAGE"); 62/061,003 (filed Oct. 7, 2014, and entitled "SYSTEMS AND METHODS FOR HOMEOWNER-DIRECTED RISK OF PROPERTY DAMAGE MITIGATION"); 62/061,018 (filed Oct. 7, 2014, and entitled "SYSTEMS AND METHODS FOR DETERMINING CAUSE OF LOSS TO A PROPERTY"); 62/061,016 (filed Oct. 7, 2014, and entitled "SYSTEMS AND METHODS FOR PREDICTIVELY GENERATING AN INSURANCE CLAIM"); 62/061,012 (filed Oct. 7, 2014, and entitled "SYSTEMS AND METHODS FOR ASSIGNING DAMAGE CAUSED BY AN INSURANCE-RELATED EVENT"); 62/061,009 (filed Oct. 7, 2014, and entitled "SYSTEMS AND METHODS FOR COMMUNITY-BASED CAUSE OF LOSS DETERMINATION"); 62/060,777 (filed Oct. 7, 2014, and entitled "SYSTEMS AND METHODS FOR MANAGING INSURANCE ASSOCIATED WITH DEVICES POPULATED WITHIN A PROPERTY"); 62/061,007 (filed Oct. 7, 2014, and entitled "SYSTEMS AND METHODS FOR AUTOMATICALLY MITIGATING RISK OF WATER DAMAGE"); 62/060,808 (filed Oct. 7, 2014, and entitled "SYSTEMS AND METHODS FOR MANAGING INSURANCE BASED ON DEVICE LOCATION WITHIN A PROPERTY"); 62/060,847 (filed Oct. 7, 2014, and entitled "SYSTEMS AND METHODS FOR MANAGING INSURANCE FOR DEVICES LOCATED WITHIN A PROPERTY BASED ON INSURANCE-RELATED EVENTS"); and 62/073,695 (filed Oct. 31, 2014, and entitled "SYSTEMS AND METHODS FOR MANAGING THE OPERATION OF DEVICES WITHIN A PROPERTY")—which are all hereby incorporated by reference in their entireties.

FIELD OF THE DISCLOSURE

The present disclosure generally relates to assigning damage to different causes of loss associated with an insurance-related event and, more particularly, to systems and methods for analyzing data transmitted by a plurality of smart devices to assign the damage.

BACKGROUND

Homeowner and personal property insurance exists to provide financial protection against damage to the home and personal property owner by the policyholder, respectively. These insurance products may provide different levels of coverage depending on the source of damage. For instance, some insurance products may fully cover wind damage but only allows the insured to recover half the loss for water damage. After an insurance-related event causes damage, it may be difficult, using hindsight, to determine the actual source of the damage. As an example, in some insurance-related events, a window may be broken due to an unknown cause, such as by either violent winds or debris in the winds, or by a water swell.

SUMMARY

The present embodiments may, inter alia, relate to interconnected or smart homes. The interconnected or smart homes may have a smart home controller and/or smart devices interconnected (or in wired or wireless communication) with the smart home controller for gathering data. The data gathered may be analyzed by the smart home controller or a remote processor associated with an insurance provider to determine the actual cause of loss (such as water, wind, fire, hail, or other causes) associated with an insurance-related event. After which, insurance policies or claims may be adjusted or handled by the insurance provider remote processor based upon the analysis of the data gathered.

In one aspect, a computer-implemented method of determining a cause of damage to a property may be provided. The property may be populated with a controller in communication with a plurality of devices in the property. Each of the plurality of devices may be configured to monitor various conditions associated with the property. The method may include (1) generating, by one or more processors (such as one or more local or remote processors associated with a smart home controller and/or an insurance provider, respectively), a time-sequence of events for an insurance-related event based upon data recorded by the plurality of devices before, during, and/or after the insurance-related event, and/or (2) identifying from the time-sequence of events, by the one or more processors, a first cause of loss and a second cause of loss associated with the insurance-related event. The method may include (3) analyzing, by the one or more processors, the recorded data to estimate an overall amount of damage caused by the insurance-related event, and/or (4) based upon the time-sequence of events, assigning, by the one or more processors, (i) a first portion of the overall amount of damage to the first cause of loss, and (ii) a second portion of the overall amount of damage to the second cause of loss. The method may also include (5) generating, by the one or more processors, a proposed insurance claim based upon the assignment of loss, and/or (6) transmitting, by the one or more processors, the proposed insurance claim to a mobile device (or other computer or communications device) of an insured for review, approval, or modification by the individual, such as via wireless communication. The method may include additional, fewer, or alternate actions, including those discussed elsewhere herein.

In another aspect, a system for determining a cause of damage to a property may be provided. The property may be populated with a controller in communication with a plurality of devices in the property. Each of the plurality of devices may be configured to monitor various conditions associated with the property. The system may include a communication module adapted to communicate data, a memory adapted to store non-transitory computer executable instructions, and/or one or more processors adapted to interface with the communication module. The one or more processors may be configured to execute the non-transitory computer executable instructions to cause the one or more processors to (1) generate, by the one or more processors, a time-sequence of events for an insurance-related event based upon data recorded by the plurality of devices before, during, and/or after the insurance-related event, and/or (2) identify from the time-sequence of events, by the one or more processors, a first cause of loss and a second cause of loss associated with the insurance-related event. The one or more processors may be configured to (3) analyze, by the one or more processors, the recorded data to estimate an overall amount of damage caused by the insurance-related event, and/or (4) based upon the time-sequence of events, assign, by the one or more processors, (i) a first portion of the overall amount of damage to the first cause of loss and (ii) a second portion of the overall amount of damage to the second cause of loss. The one or more processors may also be configured to (5) generate a proposed insurance claim based upon the assignment of loss, and/or transmit the proposed insurance to a mobile device (or other computing or communications device) or an insured for review, approval, and/or modification by the individual. The system may include additional, fewer, or alternate components, including those discussed elsewhere herein.

In still another aspect, a non-transitory computer-readable storage medium storing processor-executable instructions may be provided. When executed, the instructions may cause one or more processors to (1) generate, by the one or more processors, a time-sequence of events for an insurance-related event based upon data recorded by the plurality of devices before, during, and/or after the insurance-related event, and/or (2) identify from the time-sequence of events, by the one or more processors, a first cause of loss and a second cause of loss associated with the insurance-related event. The instructions may cause the one or more processors to (3) analyze, by the one or more processors, the recorded data to estimate an overall amount of damage caused by the insurance-related event, and/or (4) based upon the time-sequence of events, assign, by the one or more processors, (i) a first portion of the overall amount of damage to the first cause of loss and (ii) a second portion of the overall amount of damage to the second cause of loss. The instructions may also cause the one or more processors to (5) generate, by the one or more processors, a proposed insurance claim based upon the assignment of loss, and/or (6) transmit, by the one or more processors, the proposed insurance claim to a mobile device (or other computing or communications device) of an insured for review, approval, and/or modification by the individual. The non-transitory computer-readable storage medium may store additional, fewer, or alternate processor-executable instructions, including those discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 7 depicts an exemplary interface, displayable by an electronic device, for alerting a homeowner about a loss that occurred to a property in accordance with some embodiments.

FIG. 8 depicts an exemplary interface, displayable by an electronic device, for accepting or modifying a proposed insurance claim in accordance with some embodiments.

DETAILED DESCRIPTION

Figure 1:
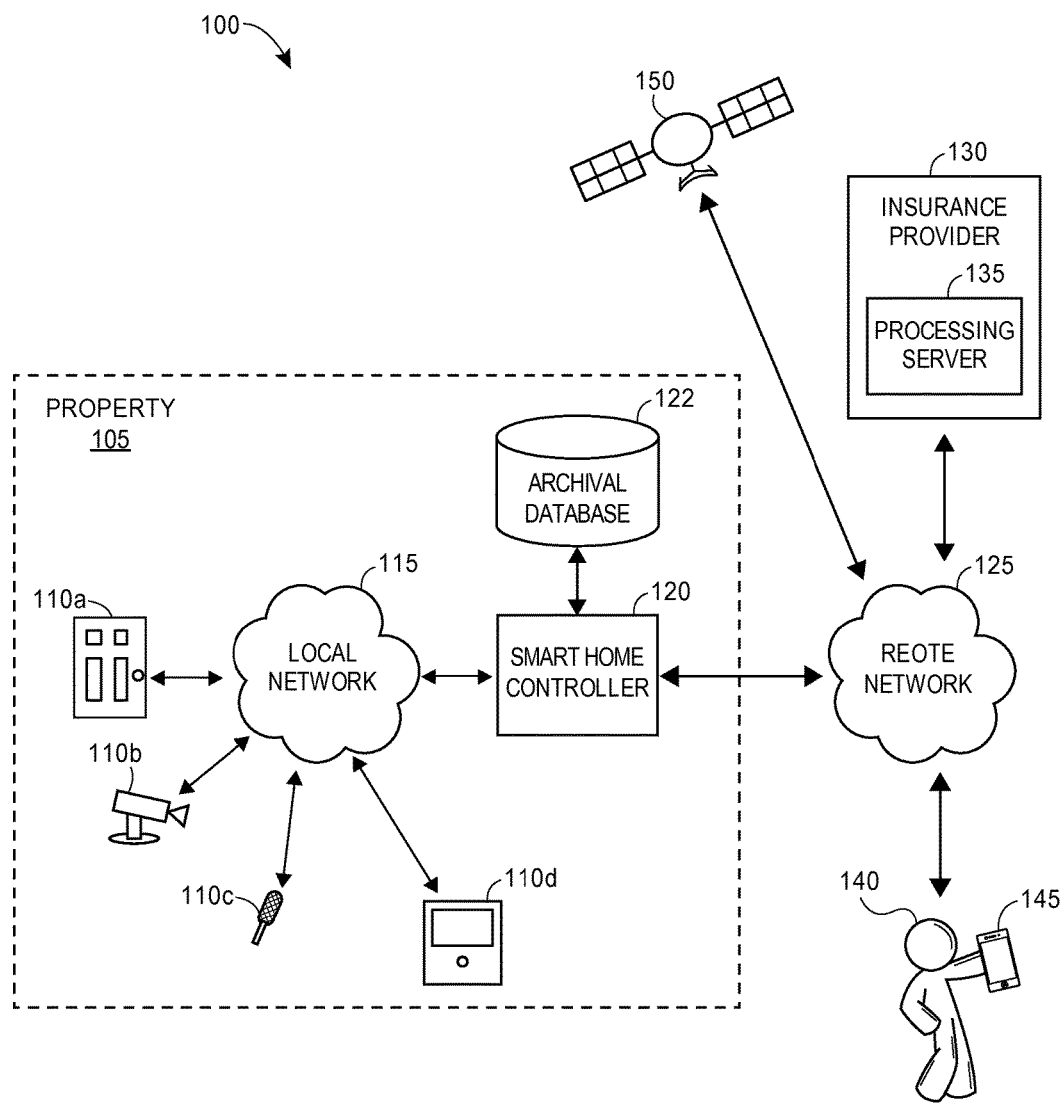
FIG. 1 depicts an exemplary environment including components and entities associated with determining the cause(s) of loss associated with an insurance-related event in accordance with some embodiments.

The present embodiments may relate to, inter alia, the determining a cause of damage to a property (such as an interconnected or smart home), and/or a sequence of events that caused damage to the property. The damage may be caused by water, fire, hail, wind, and/or other sources. The present embodiments may also relate to (a) providing and updating insurance policies; (b) handling or adjusting of home insurance claims; (c) disbursement of monies related to insurance claims; (d) providing discounts on insurance; (e) reward programs; (f) providing insurance coverage or equipment recommendations; and/or (g) other insurance-related activities.

A property may have a "smart" central controller (referred to as a "smart home controller" herein) and be wirelessly interconnected, or even hard-wired, with various household related items and/or sensors. Despite being referred to as the "smart home controller," the controller may be associated with any type of property, such as offices, restaurants, farms, and/or other types of properties. The smart home controller may be in communication with various smart appliances (e.g., clothes washer, dryer, dish washer, refrigerator, etc.); smart heating devices (e.g., furnace, space heaters, etc.); smart cooling devices (e.g., air conditioning units, fans, ceiling fans, etc.); smart plumbing fixtures (e.g., toilets, showers, water heaters, piping, interior and yard sprinklers, etc.); smart cooking devices (e.g., stoves, ovens, grills, microwaves, etc.); smart wiring, lighting, and lamps; smart personal vehicles; smart thermostats; smart windows, doors, or garage doors; smart window blinds or shutters; and/or other smart devices and/or sensors capable of wireless or wired communication. Each smart device (or smart sensor), as well as the smart home controller, may be equipped with a processor, memory unit, software applications, wireless transceiver (or otherwise be configured for RF (Radio Frequency) wireless communication), local power supply, various types of sensors, and/or other components. In some embodiments, the smart home controller may be in a weather protective "black box" to prevent damage to the data stored by the smart home controller.

The smart home controller may also be interconnected with smart security devices including video cameras, other devices capable of recording visual data, and/or mobile devices (such as smart phones, smart watches, smart glasses, smart cameras or video cameras, wearable electronics, etc.), microphones capable of recording audio data, and/or other security devices (such as motion sensors, window shatter sensors, door sensors, etc.). The digital pictures may additionally or alternatively be recorded by infrared or night-vision cameras. The recorded visual, audio, and/or other data associated with the property and personal belongings disposed on, or proximate to, the property may be recorded before, during, and/or after an insurance-related event, such as an event causing water, hail, wind, fire, earthquake, and/or other types of damage to the property or personal belongings.

The information gathered by the smart home controller from the various smart devices and/or sensors disbursed around the property may be utilized for insurance purposes. The information may be used to process or manage insurance covering the property, personal belongings, personal vehicles, etc. The information gathered by the sensors may be used to: (1) provide insurance or equipment discounts to customers; (2) update current customer policies and rates based upon smart home functionality and damage prevention and/or mitigation features; (3) initiate or handle insurance claims, and/or calculate more accurate claim amounts; (4) facilitate claim amount disbursements or adjustments; (5) develop or enhance a customer rewards program; (6) provide various insurance and/or equipment recommendations (such as recommendations related to energy savings, alternate or green energy, and/or smart home equipment) to the insured; (7) evaluate how smart home equipment disbursed on the property withstood an insurance-related event (8) determine the causes of loss and/or the sequence of events leading to home damage; and/or (9) provide other insurance products or adjustments.

The present methods and systems may also use the data gathered by the smart home controller within a property to determine the sequence of events that led to the loss. Determining the events that led to the property damage may be performed for individual properties. The methods and systems may determine that one source of damage (e.g., water) should be allocated a certain percentage of the loss or property damage, and another source of damage (e.g., wind) should be allocated another percentage of the loss or property damage.

Additionally or alternatively, determining the cause of loss may be performed by analyzing any number of properties in a geographic area to determine the potential cause of loss for a community. As an example, ten homes in the same community that are being monitored may first show that the window sensors were triggered (such as by, issuing alarms, detecting problems, or transmitting other signals), then door sensors reported a breach to home integrity, subsequently water sensors went off in the main level of the homes, and ultimately other water sensors sensed damage caused to property in the basements or to the basements themselves. By aggregating the sensor data for a community, the insurance provider may have more confidence in the determined assessment of any individual property that is a member of the community.

The foregoing set of data or data points may provide a time-stamped sequence of events that may reveal more information to automatically facilitate, by one or more processors, easier determination of the actual cause of loss and/or sequence of damage to a covered property or a plurality of properties within a community. Time-stamped sensor data, alarms, pictures or videos, sound recordings, and/or other indications from two or more sensors may be compared and/or analyzed together to determine the sequence of events and/or cause(s) of loss. The smart home capabilities of the present embodiments may include additional, fewer, or alternate capabilities, including those discussed elsewhere herein.

The systems and methods discussed herein address a challenge that is particular to insurance claim generation. In particular, the challenge relates to a lack of insurance provider ability to accurately determine a sequence of events as part of an insurance-related event that damaged a property. This is particularly apparent when there are multiple potential causes of damage to a property. For example, hindsight analysis conducted by a claims adjuster may struggle to differentiate between potential sequences of events that may have resulted in the property damage. Instead of performing this hindsight analysis, as required by conventional insurance claim processing systems, the systems and methods monitor and record data generated by a plurality of sensors disposed on the property both before and during the insurance-related event. In additional implementations, the systems and methods analyze the data generated from sensors disposed on a plurality of properties within a community to further enhance the accuracy of the sequence of event determination. In further additional implementations, the insurance provider may automatically and/or remotely generate and provide to a homeowner a proposed insurance claim for damage caused to the property based upon the determined sequence of events. Therefore, because the systems and methods employ the automatic monitoring and analysis of electronic sensors disposed on a property to generate an insurance claim, the systems and methods are necessarily rooted in computer technology in order to overcome the noted shortcomings that specifically arise in the realm of insurance claim generation.

Similarly, the systems and methods provide improvements in a technical field, namely, insurance claim generation. Instead of the systems and methods merely being performed by hardware components using basic functions, the systems and methods employ complex steps that go beyond the mere concept of simply retrieving and combining data using a computer. In particular, the hardware components compile operation data from connected devices, analyze the operation data, determine a sequence of events that caused damage to a property, analyze the sequence of events to assign each cause of loss a proportion of the damage, generate an insurance claim for the damage to the property, communicate the generated insurance claim to a homeowner, and/or receive modifications from the user to the generated insurance claims, among other functionalities. Moreover, by analyzing data received from a plurality of properties, the accuracy of the cause of loss determination models may be improved, causing an improvement to the functioning of the insurance claim generating computer itself. This combination of elements impose meaningful limits in that the operations are applied to improve insurance claim generation by improving the consolidation and analysis of operation data, and by facilitating and/or enabling the insurance claim generation in a meaningful and effective way.

The systems and methods therefore may offer a benefit to an insurance provider by enabling insurance claims to be more accurately estimated and/or more expediently processed as facilitated by the present embodiments. This increased accuracy and expediency may save the insurance provider money that was wasted on covering damage that was out-of-policy or time spent dispatching claims adjusters to the affected property. As such, the savings may be passed onto customers in the form of offering cheaper insurance products or through the creation of new insurance products better tailored to meet the needs of homeowners. Further, the methods and systems described herein may improve the technological fields of insurance, urban planning, disaster relief, building development, and/or others.

I. EXEMPLARY ENVIRONMENT FOR DETERMINING CAUSE OF LOSS

FIG. 1 depicts an exemplary environment 100 associated with determining the cause of loss associated with a property. Although FIG. 1 depicts certain entities, components, and devices, it should be appreciated that additional or alternate entities and components are envisioned.

As illustrated in FIG. 1, the environment 100 may include a property 105 that contains a smart controller 120 and a plurality of smart devices 110 that may be each connected to a local communication network 115. As shown in FIG. 1, the plurality of smart devices may include a smart door 110a, a smart surveillance camera 110b, a smart microphone 110c, and/or a smart motion sensor 110d. Although FIG. 1 depicts only one property 105, it should be appreciated that the environment 100 may contain a plurality of properties, each with its own smart home controller and plurality of smart devices. In such embodiments, the smart home controller 120 associated with the property 105 may be in communication with other smart home controllers associated with other properties via the remote network 125. Further, it should be appreciated that additional, fewer, or alternative smart devices may be present in the property 105. In some cases, the smart devices may be purchased from the manufacturer with the "smart" functionally incorporated therein. In other cases, the smart devices may have been purchased as "dumb" devices and subsequently modified to add the "smart" functionality to the device. For example, a homeowner may purchase an alarm system that installs sensors on or near a door to detect when a door has been opened and/or unlocked.

The plurality of smart devices 110 may be configured to communicate with a smart home controller 120 via the local communication network 115. The local network 115 may facilitate any type of data communication between devices and controllers located on or proximate to the property 105 via any standard or technology (e.g., Bluetooth®, RFID, X10, UPnP®, IEEE 802 including Ethernet, GSM, CDMA, LTE, and/or others). In some embodiments, the plurality of smart devices 110 may transmit, to the smart home controller 120 via the local network 115, operational data gathered from sensors associated with the plurality of smart devices 110. The operational data may be audio data, image or video data, or status data. For example, the operational data may indicate that a window has been shattered; the presence of a person, fire, or water in a room; the sound made near a smart device; and/or other information pertinent to determining a cause of damage to the property 105. In some embodiments, the operational data may be associated with a timestamp representing the time that the operational data was recorded.

In some embodiments, the smart home controller 120 may be coupled to an archival database 122 that stores past operational data associated with the plurality of smart devices 110. Although FIG. 1 depicts the archival database 122 as coupled to the smart home controller 120, it is envisioned that the archival database 122 may be maintained in the "cloud" such that any element of the environment 100 capable of communicating over either the local network 115 or the remote network 125 may directly interact with the archival database 122. In some embodiments, the archival database 122 organizes the past operational data according to which individual smart device the data is associated, and/or the room or subsection of the property it was recorded. The archival database 122 may further organize the data by when the data was recorded with respect to a first time period prior to an insurance-related event, a second period of time while the insurance-related event was ongoing, and a third period of time after the insurance-related event has concluded.

The smart home controller 120 may analyze the operational data recorded before, during and after an insurance-related event to generate a sequence of events and estimate a total amount of damage to the property. In some embodiments, visual information stored in the archival database may also be analyzed over time to identify areas of the property that are slowly deteriorating and/or in need of repair, such as siding, roofing, windows, doors, and/or other items. The smart home controller 120 may further interpret the sequence of events to automatically generate a proposed insurance claim for damage associated with the insurance-related event.

The smart home controller 120 may also be in communication with aerial sensors 150 via the remote network 125. The aerial sensors 150 may be a satellite, a drone, a manned aircraft, a blimp, or any other airborne based device capable of recording visual data of the property 105 or the community containing the property 105. The smart home controller 120 may append the aerial visual data to the locally gathered sensor data to form the operational data as described herein. The remote network 125 may facilitate any data communication between the smart home controller 120 located on the property 105 and entities or individuals remote to the property 105 via any standard or technology (e.g., GSM, CDMA, TDMA, WCDMA, LTE, EDGE, OFDM, GPRS, EV-DO, UWB, IEEE 802 including Ethernet, WiMAX, and/or others). In some cases, both the local network 115 and the remote network 125 may utilize the same technology.

The smart home controller 120 may also be in communication with an electronic device 145 associated with the homeowner 140 via the remote network 125. The electronic device 145 may be a smartphone, a desktop computer, a laptop, a tablet, phablet, a smart watch, smart glasses, wearable electronics, smart contact lenses, or other electronic or mobile device. According to some embodiments, the smart home controller may transmit, via the remote network 125, the proposed insurance claim to the electronic device 145. The proposed insurance claim may contain prepopulated fields that indicate a number of causes of loss; the types of causes of loss (water, wind, etc.) and their respective cause of loss code; a total percentage of damage; the percentage of damage associated with each cause of loss; time, date, location of the insurance-related event; and/or other information included in an insurance claim. In response, the homeowner 140 may accept the proposed insurance claim or make modifications to the proposed insurance claim. The electronic device 145 may transmit, via the remote network 125, the accepted or modified insurance claim back to the smart home controller 120.

The smart home controller 120 may also be in communication with an insurance provider 130 via the remote network 125. According to present embodiments, the insurance provider 130 may include one or more hardware server(s) 135 configured to facilitate the functionalities described herein. Although FIG. 1 depicts the insurance provider 130, it should be appreciated that other entities that are impacted by uncertainty in knowing a cause of loss are envisioned. For example, a general contractor may aggregate the insurance-risk data across many properties to determine which appliances or products provide the best protection against specific causes of loss and deploy the appliances or products based upon where causes of loss are most likely to occur. Further, although FIG. 1 depicts the hardware server 135 as part of the insurance provider 130, it should be appreciated that the hardware server 135 may be separate from (and connected to or accessible by) the insurance provider 130 or other entity interested in monitoring the data described herein.

The smart home controller 120 may also transmit to the insurance provider 130, via the remote network 125, information about the sequence of events and/or an accepted or modified insurance claim associated with the damage caused by the sequence of events. The insurance provider 130 may use the received information to identify and facilitate an insurance-related activity, such as issuing warnings; determining cause of loss (such as described above with respect to the smart home controller 120); automatically performing corrective or preventive actions; and/or updating insurance policies or rates, handling insurance claims, recommending replacement equipment, evaluating how current equipment withstood the insurance-related event, and/or performing other insurance-related actions.

In some embodiments, display monitors at the insurance provider 130 may synchronize and depict the multiple sets of visual data used to confirm the determined sequence of events represented by the insurance claim. The display enables performing side-by-side comparisons to allow for efficient confirmation of the actual sequence of events, the cause of damage or loss, and the severity of the damage or loss, and/or ensuring the accuracy of the transmitted insurance claim. It should be appreciated that in some embodiments, the insurance provider 130, instead of the smart home controller 120, may analyze the sequence of events to automatically generate an insurance claim, transmit the generated claim to the homeowner 140, and receive the modifications and/or acceptance. The exemplary environment 100 may include additional, fewer, or alternate components, including those discussed elsewhere herein.

II. EXEMPLARY INSURANCE CLAIM GENERATION

Figure 2:
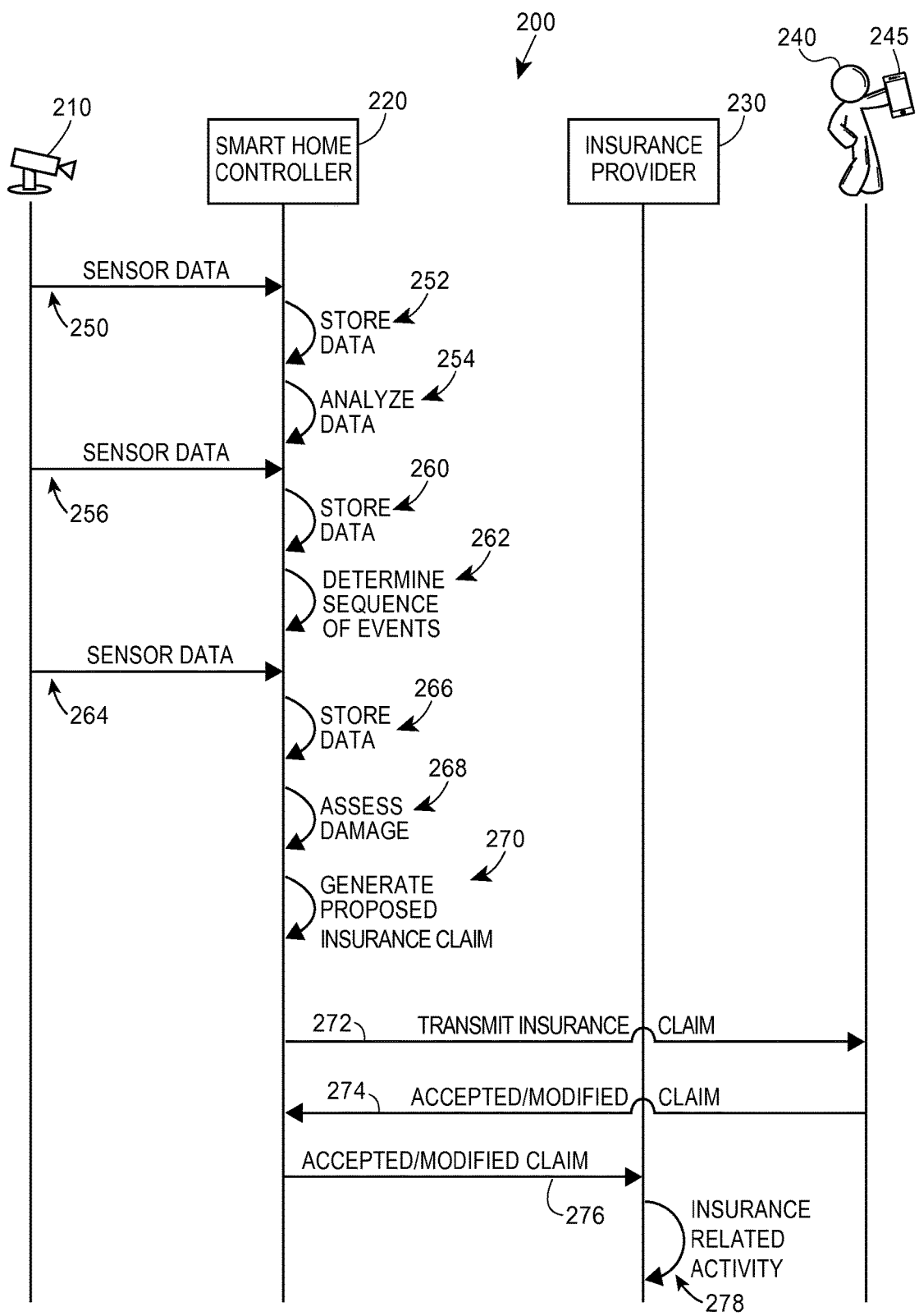
FIG. 2 depicts an exemplary diagram associated with determining a cause of loss for an insurance-related event and filing an insurance claim for the loss in accordance with some embodiments.

Referring to FIG. 2, illustrated is a signal diagram 200 associated with determining the cause of loss for a property, and subsequently, performing an insurance-related activity. In particular, FIG. 2 may include a smart device 210 (such as any of the plurality of smart devices 110 as described with respect to FIG. 1), a smart home controller 220 (such as the smart home controller 120 as described with respect to FIG. 1), an insurance provider 230 (such as the insurance provider 130 as described with respect to FIG. 1), and a homeowner 240 (such as the homeowner 140 as described with respect to FIG. 1) associated with an electronic device 245 (such as the electronic device 145 as described with respect to FIG. 1). In some embodiments, the smart home controller 220 may be coupled to an archival database that stores past operational data (such as the archival database 122 as described with respect to FIG. 1). Although FIG. 2 depicts the smart device 210 as a smart security camera, the smart device 210 may be any smart device disposed on or proximate to a property. Further, although FIG. 2 depicts a single smart device, the smart home controller 220 may be in (wired or wireless) communication with any number of smart devices disposed on or proximate to a property. It should be appreciated that the electronic device 245 may be any electronic or mobile device (e.g., a smartphone, a desktop computer, a laptop, a tablet, a smart watch, smart glasses, wearable electronics, etc.).

The signal diagram 200 may begin when the smart device 210 transmits (250) operational data to the smart home controller 220. The operational data may include time-stamped information relevant to determining a cause of loss, such as audio data, image or video data, or data regarding the status of any characteristic of the operation of the smart device 210. The smart device 210 may be configured to transmit the operational data at a regular interval (e.g., every ten seconds) and/or in response to a trigger event (e.g., when the smart device 210 detects the presence of water). It should be appreciated the length of the regular interval may vary based upon the type of the smart device 210 and/or the operational state of the smart device 210. For example, a smart security camera may transmit visual data twenty four (24) times each second, while a smart microphone may transmit audio data 48,000 times a second. When the smart home controller 220 receives the operational data, it may store (252) the data in the archival database. In some embodiments, the data in the archival database may be stored chronologically.

According to some embodiments, the smart home controller 220 may analyze (254) the data stored in the archival database. The analysis may include analyzing the data stored in the archival database to establish a baseline model for the smart device 210. The newly received data may then be compared to the baseline model to determine that an insurance-related event is predicted to begin or has just begun. For example, the smart home controller 220 may detect that a storm is forecasted to impact the property in the near future or that a window has been shattered. Subsequently, the smart home controller 220 may store in the archival database an indication of what the insurance-related event is and when it was detected. It should be appreciated there are many ways known in the art to associate received data with an event; any description herein is representative of a particular method and is not limiting. The smart home controller 220 may create a segment in the archival database for storing operational data associated with the active insurance-related event. In some cases, data received and stored within a certain time frame prior to the actual or predicted commencement of the insurance-related event may be copied into this active event segment to establish a baseline or "before" representation of the property. After the creation of the active event segment in the archival database, when the smart home controller 220 receives (256) new operational data, it may be stored (260) in the active event segment in addition to, or instead of, the normal chronological archive of operational data.

The smart home controller 220 may compare the received data to the "before" data to determine (262) a sequence of events associated with the insurance-related event. The sequence of events may indicate, for example, when a window or door was damaged or broken; when water started coming into the home and from where; the first cause of loss or home damage during an insurance-related event, the second cause of loss, etc.; how much each source of damage contributed to specific damage and/or the overall damage; and/or other information. Further, the received data may be analyzed to detect that the insurance-related event has passed and/or the environment on the property has returned to a stable condition. For example, the smart home controller 220 may detect that the aforementioned storm system has passed or that the water-level of a flooded basement has remained at a constant level.

Once the smart home controller 220 detects that the insurance-related event has concluded, for another certain time frame, the smart home controller 220 may receive (264) and store (266) new operational data in the active event segment of the archival database to establish an "after" representation of the property. The smart home controller 220 may compare the "after" data to the "before" data to assess (268) the damage to the property associated with the insurance-related event. For example, the comparison may analyze visual data to determine that a window is broken or that water and/or fire has damaged belongings disposed on, or within, the property. The smart home controller 220 may utilize the assessment to determine or calculate an estimate of the total amount of damage caused to the property (or belongings disposed on, or within, the property). Once the "after" representation has been established, new operational data may cease being stored in the active event segment and resume being stored only in the chronological archive.

According to some embodiments, the smart home controller 220 may further analyze the sequence of events and assessment of damage data to generate and prepopulate (270) a proposed insurance claim for damage associated with the insurance-related event. In some embodiments, the smart home controller 220 may compare the sequence of events data to damage assessment data determine any causes of loss associated with the damage (to the property and/or belongings disposed on, or within, the property) and a portion of the damage associated with each cause of loss. For example, the smart home controller 220 may determine that wind debris damaged a roof enabling water to damage belongings on the top floor of the property. In that scenario, the smart home controller may assign a larger portion of the damage to the wind-related cause of loss than to the water-related cause of loss. In other embodiments, the property may employ a system that inventories belongings on a property and automatically detects and reports damage for the belongings when damaged. Once the total amount of damage is known, the insurance provider may further analyze the cause of loss data to determine a source of the damage.

Once the smart home controller 220 has determined the cause(s) of loss and the amount of damage associated with each cause of loss, the insurance provider may prepopulate corresponding fields on the proposed insurance claim. For example, a typical insurance claim may have fields to detail what was damaged, the value of the item damaged, the source of the damage, where the damaged item is located on the property, and/or other fields. After prepopulating the proposed insurance claim, the smart home controller 220 may transmit (272) the proposed insurance claim to the electronic device 245 associated with the homeowner 240. The electronic device 245 may enable the homeowner 240 to accept the insurance claim as is, or to make modifications to the insurance claim. The electronic device 245 may transmit (274) the accepted or modified claim back to the smart home controller 220.

If the homeowner 240 modified the proposed insurance claim, the smart home controller 220 may analyze the modifications to ensure that the modifications are consistent with the sequence of events. For example, if a homeowner 240 modified a proposed insurance claim to include damage to a window that the sequence of events depicts as broken prior to the commencement of the insurance-related event, the smart home controller 220 may alert the homeowner 240 that the modified insurance claim is not supported by the sequence of events and request that the homeowner confirms the modifications prior to processing. After receiving an accepted insurance claim or confirming the changes in a modified insurance claim, the smart home controller may transmit (276) the accepted or modified insurance claim to the insurance provider 230. In some embodiments, the sequence of events data is transmitted along with the accepted or modified insurance claim.

The insurance provider 230 may analyze the sequence of events data to perform (278) an insurance-related activity, such as processing the accepted or modified insurance claim. To facilitate the analysis, the time-stamped sequence of events data may be displayed on computers, monitors, or other display screens for side-by-side comparison or quadrant comparison. For instance, (a) the video from a first camera located on the ground floor of a home, and (b) the video from a second camera located on the second floor of the home may be displayed for side-by-side comparison. Alternatively, video from four cameras associated with the home may be presented in four quadrants of a screen for more efficient and accurate determination of the actual sequence of events and/or cause of loss to the property. Other insurance-related activities may be recommending replacement equipment or providing an analysis about how well the equipment disposed on, or within, the property withstood the insurance-related event. It should be appreciated that in some embodiments, the insurance provider 230 may analyze the sequence of events and/or damage assessment data to generate and prepopulate a proposed insurance claim and communicate with the homeowner 240.

The insurance provider 230, and/or one or more remote processors or servers associated with the insurance provider 230, may perform the same functionality and analysis described above with respect to the smart home controller 220. For instance, the smart devices 210 and/or smart home controller 220 may be in wireless communication with an insurance provider 230 remote processor or server, and transmit data to the insurance provider 230 for remote analysis of the data by the insurance provider 230 remote processor or server, which may determine cause(s) of loss, generate insurance claims, process insurance claims, and/or perform other actions or analysis.

III. EXEMPLARY SEQUENCE OF EVENTS DETERMINATION

Figure 3:
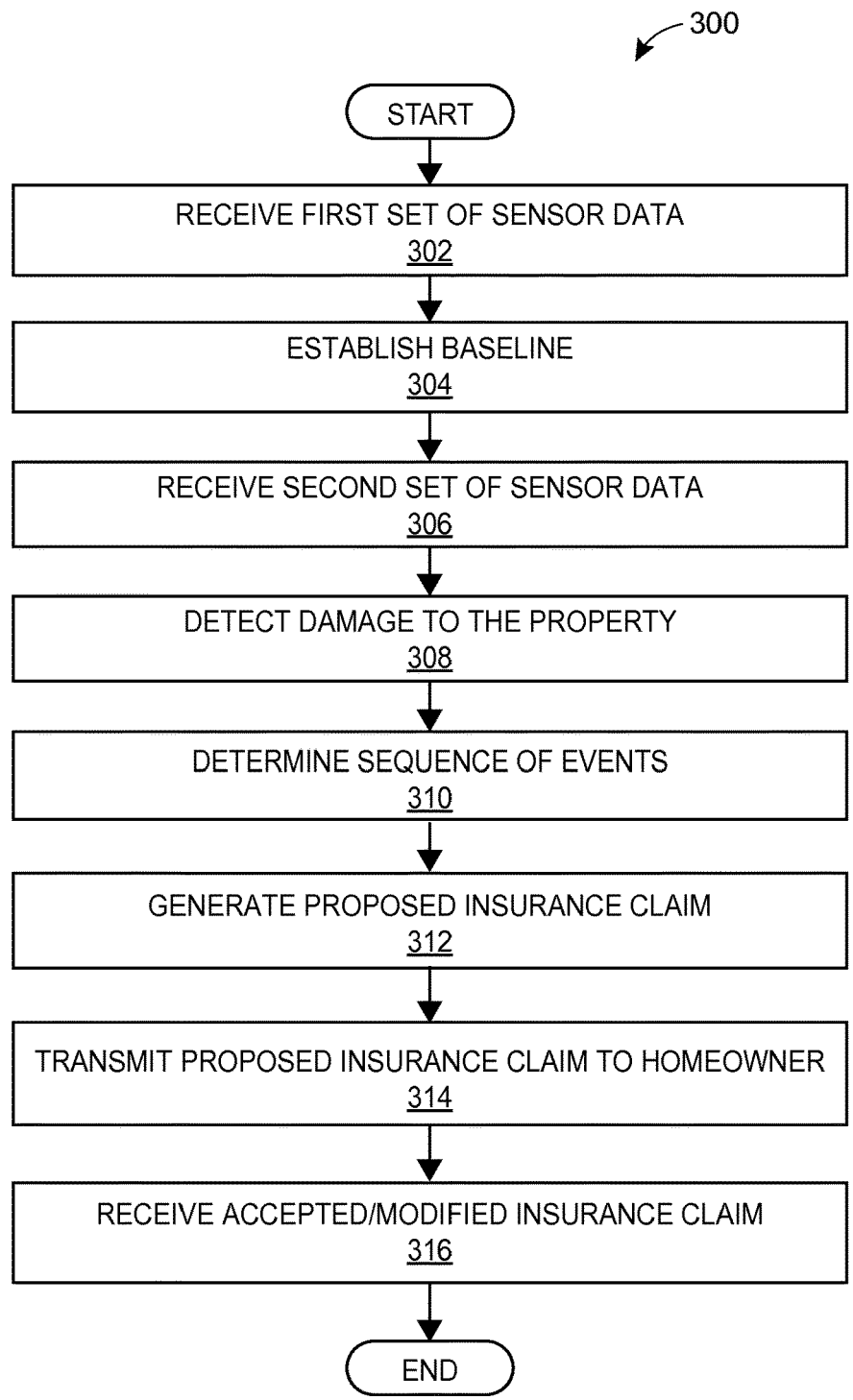
FIG. 3 depicts an exemplary flow diagram associated with a smart home controller determining a sequence of events associated with an insurance-related event in accordance with some embodiments.

Referring to FIG. 3, depicted is a block diagram of an exemplary method 300 for determining a sequence of events in which an insurance-related event caused damage to a property. The method 300 may be facilitated by a smart home controller (such as the smart home controller 120 as depicted in FIG. 1) and/or an insurance provider (such as a remote processor or server of the insurance provider 130 as depicted in FIG. 1) in wired or wireless communication with a plurality of smart devices (such as the plurality of smart devices 110 as depicted in FIG. 1), and a homeowner (such as the homeowner 140 as depicted in FIG. 1).

The method 300 may begin by the smart home controller (and/or an insurance provider remote processor or server) receiving a first set of sensor data from the plurality of smart devices (block 302). The first set of data may include visual data, audio data, and operational status data generated from smart cameras taking photographs or video, infrared or motion sensors, wind or water sensors, microphones, speakers, and/or other data collection devices disposed on, or within, the property and capable of recording data relevant to determining a sequence of events. In some cases, the first set of data may additionally include visual data captured by an airborne sensor above the property. The data collected may be time stamped or otherwise associated with a specific time.

In some cases, an initial part of the first set of data may be analyzed to determine if a particular type of additional supporting data is needed to determine the sequence of events. For example, the initial part of the first set of data may consist of a barometer reading or a weather history that indicates a strong storm is imminent. The smart home controller may determine that aerial data is necessary to properly determine the sequence of events relating to strong storm systems. As a result, the smart home controller may ensure that the first set of data includes data captured from the airborne sensor above the property. It should be appreciated that the initial part of the first set of data may have originated from the airborne sensor above the property itself.

The smart home controller may analyze the first set of sensor data to establish a baseline for normal operating conditions associated with the property (block 304). The baseline may represent the condition of the property prior to an insurance-related event damages the property. For example, the baseline may indicate that windows or walls are intact, an absence of water in the basement, or personal property on the property is undamaged. Similarly, the baseline may indicate that the property was damaged prior to experiencing further damage due to an insurance-related event.

After establishing a baseline for normal operating conditions associated with a property, the smart home controller may receive a second set of sensor data from the plurality of smart devices to detect that an insurance-related event is occurring (block 306). In some cases, the second set of data may be compared to the baseline to detect a variance indicative of a commencement of an insurance-related event. For example, a wind speed sensor may detect that the average wind speed for a given amount of time exceeds the normal wind speed experienced on the property. Accordingly, the smart home controller may determine that the increased wind speed is indicative of a wind storm occurring on the property. In other cases, the second set of data may contain a status update indicative of the commencement of an insurance-related event. For example, a window with shatter sensors may transmit to the smart home controller an indication that the window has shattered in response to the shatter sensors detecting that the window has shattered.

The second set of sensor data may be further compared to the baseline to detect if the property has been damaged due to an insurance-related event (block 308). Returning to the wind storm example, the second set of data may also include an indication that a window has shattered or that shingles have flown off a roof. The smart home controller may compare visual data of the window and roof in the second set of data to the baseline to determine if the window and roof were damaged as a result of the insurance-related event. Other types of damage that may be detected include water damage, wind damage, fire damage, earthquake damage, and damage caused by a breach of structural integrity. After detecting damage to the property, the smart home controller may determine a sequence of events that caused the damage (block 310).

The sequence of events may describe how the insurance-related event damaged the property. For example, the sequence of events for the wind storm may describe how the property experienced abnormally strong winds and, while the winds were still strong, a window on the property shattered. In some cases, the shattered window may lead to the recording of secondary causes of damage in the second set of data, such as visual data depicting the winds knocking over a grandfather clock in the room with the shattered window.

In one aspect, the smart home controller may generate a proposed insurance claim for damage caused by the insurance-related event in accordance with the determined sequence of events (block 312). As part of generating the proposed insurance claim, the smart home controller may estimate an overall amount of damage the insurance-related event caused to the property. To accurately estimate the amount of damage caused by the insurance-related event, the smart home controller may receive a third set of data after the termination of the insurance-related event or when the environment on the property has stabilized. The third set of data may be compared to the baseline to detect the full scope of which property was damaged as well as an extent of the property damage. For example, the third set of data may be compared to the baseline to determine that since the baseline was established, a window was shattered and a grandfather clock was broken. The smart home controller may then estimate the cost to repair the broken window and replace or repair the grandfather clock.

After determining an amount of damage that the insurance-related event caused, the smart home controller may prepopulate fields in an insurance claim with information related to the insurance-related event, the amount of damage and/or information pertaining to the sequence of events. Returning to the wind storm example, the proposed insurance claim may contain information that states that high winds shattered the window and knocked over the grandfather clock causing $2000 of damage overall.

Once an insurance claim is generated, the smart home controller may transmit the proposed insurance claim, via a communication network, to an electronic device associated with the homeowner (block 314). An interface on the electronic device may enable the homeowner to approve and/or modify the proposed insurance claim. After the homeowner approves and/or modifies the proposed insurance claim, the electronic device may transmit the approved and/or modified insurance claim back to the smart home controller via the communication network.

The smart home controller may receive the approved and/or modified insurance claim (block 316). In some embodiments, the smart home controller may further transmit the approved and/or modified insurance claim to an insurance provider associated with the property along with any data received by the smart home controller. The insurance provider may analyze the approved and/or modified insurance claim and recorded data to process the claim, recommend replacement equipment to protect against future insurance-related events, and evaluate how equipment associated with the property withstood the insurance-related event.

It should be appreciated that in some embodiments, additionally or alternatively, some or all or the actions associated with blocks 302-316 may be performed by the insurance provider and/or one or more remote processors or servers associated with the insurance provider. The method 300 may include additional, fewer, or alternate actions, including those discussed elsewhere herein.

IV. EXEMPLARY CAUSE OF LOSS DETERMINATION

Figure 4:
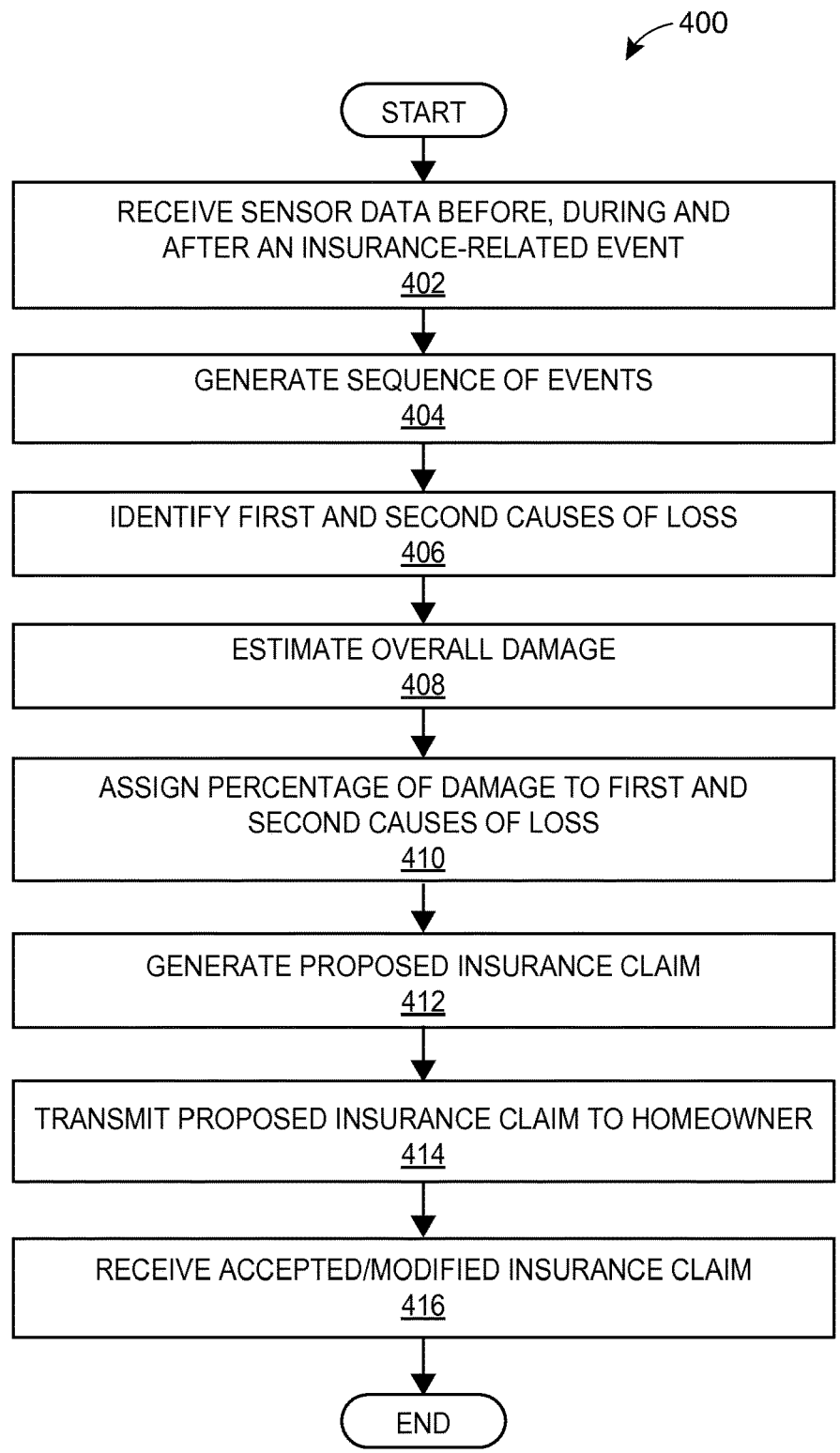
FIG. 4 depicts an exemplary flow diagram associated with a smart home controller determining an amount of damage caused by a first and second cause of loss associated with an insurance event in accordance with some embodiments.

Referring to FIG. 4, depicted is a block diagram of an exemplary method 400 for determining causes of loss associated with damage caused by an insurance-related event. The method 400 may be facilitated by a smart home controller (such as the smart home controller 120 as depicted in FIG. 1) and/or an insurance provider (such as a remote processor or server of the insurance provider 130 as depicted in FIG. 1) in wired or wireless communication with a plurality of smart devices (such as the plurality of smart devices 110 as depicted in FIG. 1), and a homeowner (such as the homeowner 140 as depicted in FIG. 1).

The method 400 may begin when the smart home controller (and/or insurance provider remote processor or server) receives data from the plurality of smart devices before, during, and after an occurrence of an insurance-related event (block 402). The smart home controller may analyze the sets of data received before, during, and after the occurrence of the insurance-related event to generate a sequence of events (block 404). The smart home controller may generate the sequence of events through performing the actions associated with blocks 302-310 for the method 300 as described with reference to FIG. 3.

The smart home controller may analyze the sequence of events to determine a first and second cause of loss (block 406). For example, during a storm, a tree branch may fall through a roof of the property, leading to rain entering the property through the newly created hole, causing water or flooding damage to property on the top floor. The tree branch falling through the roof may be a first cause of loss and the rain/water may be a second cause of loss.

According to present embodiments, the smart home controller may estimate an overall amount of damage to the property (block 408). The sensor data captured before, during, and/or after images of the property was damaged may be used to determine a total amount of damage to the property itself and/or individual pieces of personal property. For instance, for the tree branch falling through the roof, it may be determined that in addition to damage to the roof, the tree branch crushed and destroyed a dresser located on the top floor of the property. Further, rain water from the hole in the roof may damage electronics (such as a TV or alarm clock) located on the top floor of the property. In instances in which the smart home controller determined that a particular type of additional supporting data was necessary, the smart home controller may ensure that the particular type of additional supporting data is used to determine the amount of damage to the property and/or individual pieces of personal property.

In one aspect, the "before" sensor data may be used to assign relatively accurate beginning values to personal property disposed on, or within, the property prior to the insurance-related event. The "during" and/or "after" sensor data may be used to assign relatively accurate current values to the same personal property that were disposed on, or within, the property at the time of the insurance-related event and that are now partially damaged or completely destroyed. The smart home controller may calculate a difference in the beginning values and the current values to estimate an overall value for damage caused by the insurance-related event.

The smart home controller may assign a percentage of the overall damage to each of the first and second causes of loss (block 410). To assign the percentage of damage, the smart home controller may determine whether the first cause of loss is a primary cause of loss that led to a secondary cause of loss or that the first cause of loss is a secondary cause of loss that occurred as a result of the primary cause of loss. According to embodiments, if the first cause of loss is the primary cause of loss, then the second cause of loss is the secondary cause of loss. Similarly, if the first cause of loss is the secondary cause of loss, then the second cause of loss is the primary of loss. Returning to the falling tree branch example, the tree branch falling through the roof (the first cause of loss) may have led to water damaging to electronics on the top floor of the property (the second cause of loss). In this example, the falling tree branch is the primary cause of loss and the water damage is the secondary cause of loss.

After determining the primary and secondary causes of loss, the smart home controller may assign a portion of the overall damage to the first and second causes of loss. In some embodiments, the primary cause of loss may be assigned a larger portion of the overall damage than the secondary cause of loss. Accordingly, the smart home controller may assign each cause of loss identified, a percentage of the overall amount of damage. For instance, 80% of total damage to the property may be assigned to the tree branch falling through the roof, with the remaining 20% of damage being assigned to the subsequent water damage. In some embodiments, the primary cause of loss may be assigned 100% of the overall damage.

Once the causes of loss have been identified and assigned their respective portion of damage, the smart home controller may generate an insurance claim for damage associated with the insurance-related event (block 412). Based upon the specific policies and/or coverage for the homeowner, the smart home controller may generate an appropriate proposed insurance claim.

As an example, the homeowner's policy may cover 100% of roof damage and 50% of water damage. The smart home controller may determine that the overall damage to the property is $10,000 and that 80% of the damage is assigned to the falling branch and 20% assigned to the water damage. Accordingly, the generated proposed insurance claim may indicate that a total $8,000 (10,000*1*0.8) may be recovered for the roof damage and $1,000 (10,000*0.5*0.2) may be recovered for the water damage, thus enabling the homeowner to recover an overall amount of $9,000 (8,000+1,000).

Once an insurance claim is generated, the smart home controller may transmit the proposed insurance claim, via a wired or wireless communication network, to an electronic device associated with the homeowner (block 414). An interface on the electronic device may enable the homeowner to approve and/or modify the proposed insurance claim. After the homeowner approves and/or modifies the proposed insurance claim, the electronic device may transmit the approved and/or modified insurance claim back to the smart home controller via the communication network.

The smart home controller may receive the approved and/or modified insurance claim (block 416). In some embodiments, the smart home controller may further transmit the approved and/or modified insurance claim to an insurance provider associated with the property along with any data received by the smart home controller. The insurance provider or an insurance provider remote processor or server may analyze the approved and/or modified insurance claim and recorded data to process the claim, recommend replacement equipment to protect against future insurance-related events, and evaluate how equipment associated with the property withstood the insurance-related event.

It should be appreciated that in some embodiments, additionally or alternatively, some or all or the actions associated with blocks 402-416 may be performed by the insurance provider and/or one or more remote processors or servers associated with the insurance provider. The method 400 may include additional, fewer, or alternate actions, including those discussed elsewhere herein.

V. EXEMPLARY METHODS OF PREDICTING INSURANCE CLAIMS

Figure 5:
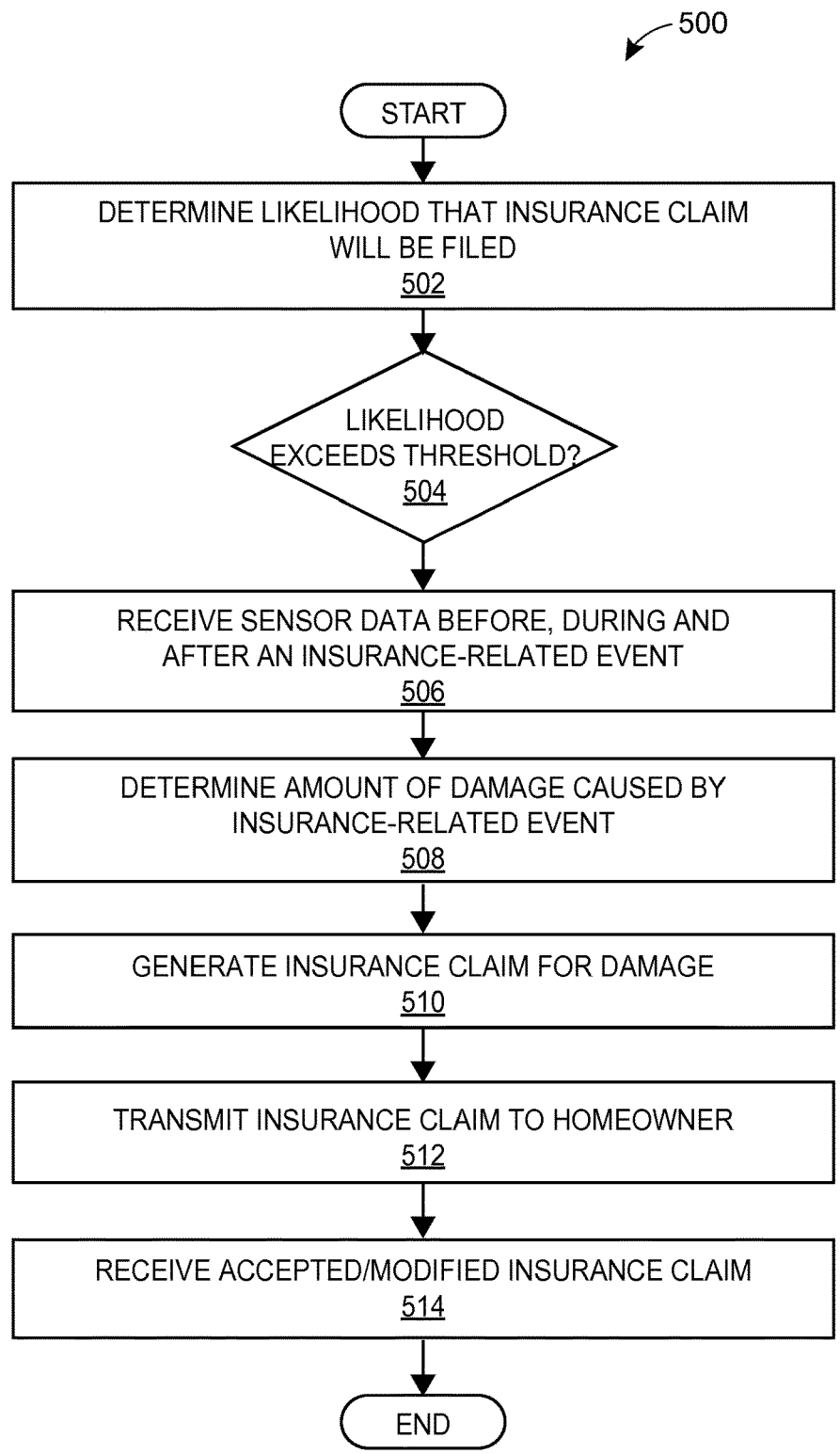
FIG. 5 depicts an exemplary flow diagram associated with a smart home controller predicting that an insurance claim will be filed in response to an insurance event in accordance with some embodiments.

Referring to FIG. 5, depicted is a block diagram of an exemplary method 500 for predicting that an insurance claim will be filed and automatically generating the insurance claim on behalf of the homeowner. The method 500 may be facilitated by a smart home controller (such as the smart home controller 120 as depicted in FIG. 1) and/or an insurance provider (such as a remote processor or server of the insurance provider 130 as depicted in FIG. 1) in wired or wireless communication with a plurality of smart devices (such as the plurality of smart devices 110 as depicted in FIG. 1), and a homeowner (such as the homeowner 140 as depicted in FIG. 1).

In some cases, the smart home controller (and/or one or more insurance provider remote processors or servers) may receive a first set of data from the plurality of smart devices. This first set of data may be analyzed to detect potential insurance-related events and to determine the likelihood that an insurance claim will be filed in response to the potential insurance-related event (block 502). In other cases, the smart home controller may receive an alert from an insurance provider about a future insurance-related event (e.g., a severe weather alert). The likelihood may be determined by predicting the odds that the insurance-related event will or may cause damage to the property. For example, a high likelihood of filing an insurance claim may be associated with particular types of insurance-related events that are predicted to impact the property, or insurance-related events that have already caused damage to nearby properties in the same community. If, for example, the insurance-related event is a storm system, the smart home controller may be able to receive data indicating the severity of the storm system and adjust the likelihood accordingly. In addition to storm systems, the smart home controller may be configured to detect and analyze the likelihood that an insurance claim will be filed in response to a fire or wildfire, an equipment failure, a national or local emergency, an earthquake or aftershock, a tsunami, an oil spill, a volcano eruption, and/or any other potential source of damage to the property.

After determining the likelihood that an insurance-related event will generate an insurance claim, the smart home controller may compare the likelihood to a threshold (block 504). In some cases, the threshold may be a percentage (e.g., 50%) that must be exceeded before the smart home controller will begin the steps to automatically generate a proposed insurance claim. If the determined likelihood is not greater than the threshold (e.g., the threshold is 70% and the determined likelihood is 30%) ("NO"), the smart home controller may return to the beginning of the method 400 and continue determining likelihoods of generating an insurance claim. If the determined likelihood is greater than the threshold (e.g., the threshold is 60% and the determined likelihood is 80%) ("YES"), the smart home controller may create a segment in a memory dedicated to storing sensor data associated with the insurance-related event.

The smart home controller may receive and store sensor data in the segment before, during and after the occurrence of the insurance-related event (block 506). In some scenarios, data may not be stored in the segment until a certain time before the insurance-related event is expected to begin. For example, if the smart home controller receives an alert at 7:00 p.m. that an extreme storm is expected in the area at 9:00 p.m., the smart home controller may wait until 8:55 p.m. before storing data in the segment. Similarly, data may cease to be stored in the segment until after it is determined that the insurance-related event has terminated and the environment surrounding the property is stable.

According to some embodiments, the smart home controller may analyze the data stored in the segment to determine an overall amount of damage to the property caused by the insurance-related event (block 508). The smart home controller may further analyze the data stored in the segment to determine a first and second cause of loss that contributed to the overall amount of damage to the property. Each of the first and second cause of loss may be assigned a percentage of the damage used to calculate a dollar amount of the overall amount of damage attributed to each of the first and second cause of loss. In some embodiments, the data stored in the segment may be analyzed to determine if a primary cause of loss led to damage by a secondary cause of loss. In such cases, the primary cause of loss may be assigned a higher percentage of the overall damage than the secondary cause of loss. For example, the smart home controller may determine that a storm caused $40,000 of damage to a property. The recorded data may indicate that 75% of the damage was due to water-related causes and that 25% of the damage was due to wind-related causes. In such a scenario, the water-related causes of loss contributed to $30,000 of the damage to the property and the wind-related causes of loss contributed to $10,000 of the damage to the property.

The smart home controller may interpret the amount of damage associated with each cause of loss to automatically generate a proposed insurance claim for the damage to the property (block 510). The proposed insurance claim may be prepopulated with information related to the insurance-related event and/or information pertaining to the amount of damage associated with each of the first and second causes of loss. The overall amount claimed in the insurance claim may vary from the overall amount of damage based upon the insurance policy or coverage associated with the property and/or homeowner.

Once an insurance claim is generated, the smart home controller may transmit the proposed insurance claim, via a communication network, to an electronic device associated with the homeowner (block 512). An interface on the electronic device may enable the homeowner to approve and/or modify the proposed insurance claim. After the homeowner approves and/or modifies the proposed insurance claim, the electronic device may transmit the approved and/or modified insurance claim back to the smart home controller via the communication network.

The smart home controller may receive the approved and/or modified insurance claim (block 514). In some embodiments, the smart home controller may further transmit the approved and/or modified insurance claim to an insurance provider associated with the property. The insurance provider, or one or more insurance provider remote processors or servers, may analyze the approved and/or modified insurance claim to process the claim, recommend replacement equipment to protect against future insurance-related events, and/or evaluate how equipment associated with the property withstood the insurance-related event.

It should be appreciated that in some embodiments, additionally or alternatively, some or all or the actions associated with blocks 502-516 may be performed by the insurance provider and/or one or more remote processors or servers associated with the insurance provider. The method 500 may include additional, fewer, or alternate actions, including those discussed elsewhere herein.

VI. EXEMPLARY METHODS OF DETERMINING CAUSES OF LOSS BASED UPON DAMAGE TO OTHER PROPERTIES

Figure 6:
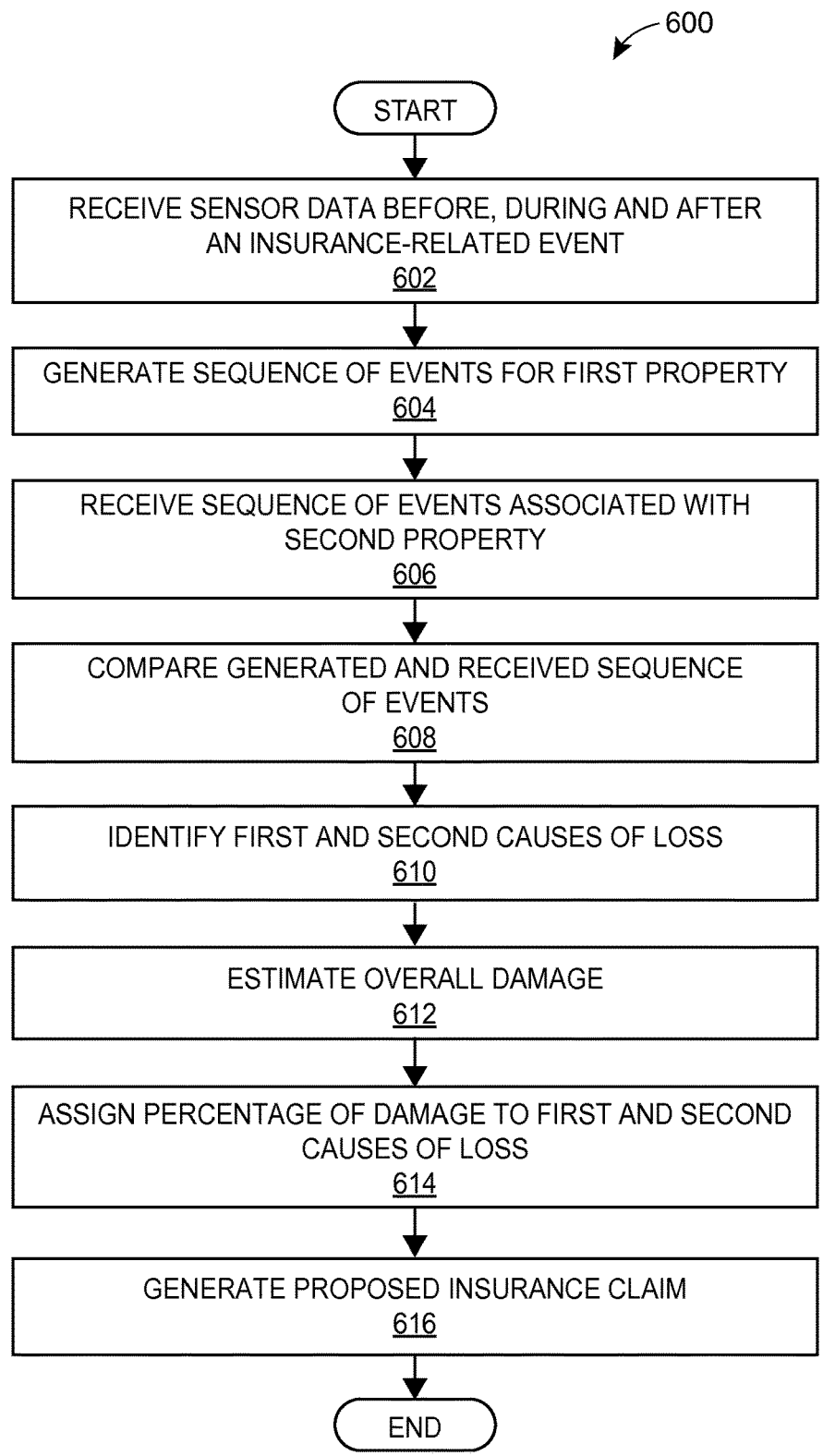
FIG. 6 depicts an exemplary flow diagram associated with a smart home controller determining a cause of loss associated with an insurance event for a property based upon data collected on other properties in the same community in accordance with some embodiments.

Referring to FIG. 6, depicted is a block diagram of an example method 600 for determining causes of loss associated with damage to a first property by an insurance-related event based data associated with damage to a second property. The method 600 may be facilitated by a smart home controller (such as the smart home controller 120 as depicted in FIG. 1) and/or an insurance provider (such as a remote processor or server of the insurance provider 130 as depicted in FIG. 1) in wired or wireless communication with a plurality of smart devices (such as the plurality of smart devices 110 as depicted in FIG. 1), and a homeowner (such as the homeowner 140 as depicted in FIG. 1).

The method 600 may begin when the smart home controller (and/or one or more remote processors or servers associated with an insurance provider) receives data from the plurality of smart devices disposed on, or within, a first property before, during, and/or after an occurrence of an insurance-related event (block 602). The smart home controller may analyze the sets of data received before, during, and/or after the occurrence of the insurance-related event to generate a sequence of events associated with the first property (block 604). The smart home controller may generate the sequence of events through performing the actions associated with blocks 302-310 for the method 300 as described with reference to FIG. 3.

Additionally, the smart home controller may receive, via a wired or wireless communication network, a sequence of events from a second property associated with damage from the same insurance-related event (block 606). For example, a river near a community may flood causing flooding damage to several properties in the community (or, as another example, a hurricane may cause damage to several waterfront homes or neighborhoods, such as by high winds or gusts, ocean or storm surge, flooding, hail, and/or heavy rain). The smart home controller from each property in the community may generate a sequence of events detailing how the associated individual property was damaged by the insurance-related event. The smart home controllers may further transmit the generated sequence of events to other properties in the community and receive sequences of events from other properties in the communities.

Subsequently, the smart home controller may compare the generated sequence of events to the received sequences of events from other properties in the community (block 608). The smart home controller may analyze the sequences of events to determine that the damage caused by the insurance-related event to the first property is consistent with the damage to other properties in the community. For example, the sequences of events may all indicate that when the water level reached a certain height, the water pressure shattered windows on the ground floor on all nearby properties, enabling the flood waters to flood the basements on all of the properties. The comparison may also detect that the first property properly mitigated the risk of flood damage by closing storm shutters to prevent the flood waters from shattering the windows. In that scenario, the comparison of the sequences of events may reveal that water failed to enter buildings on the first property but water did enter buildings on the second property.

The smart home controller may analyze the comparison of the sequences of events to determine a first and second cause of loss (block 610). The comparison may indicate that a similar sequence of events occurred at both the first property and other properties in the community. According to some scenarios, a determination for a first and second cause of loss may have already been made at the other properties. If the smart home controller associated with the first property determines the same or similar first and second causes of loss, the smart home controller may have more confidence in the accuracy of the assessment. For example, the other properties in the community may determine that a window shattering during the flood may be a first cause of loss, and the subsequent interior flooding damage may be a second cause of loss. If the smart home controller associated with the first property determines the same first and second causes of loss, it is likely that the smart home controller associated with the first property did not err in determining the first and second causes of loss.

According to some embodiments, the smart home controller may estimate an overall amount of damage to the property (block 612). The sensor data captured before, during, and/or after the first property was damaged may be used to determine a total amount of damage to the first property itself and/or individual pieces of personal property. For instance, in addition to shattering the windows on the ground floor, the flooding may also have destroyed all personal belongings on the ground floor.

In one aspect, the "before" sensor data may be used to assign relatively accurate beginning values to personal property disposed on, or within, the first property prior to the insurance-related event. The "during" and/or "after" sensor data may be used to assign relatively accurate current values to the same personal property that were disposed on, or within, the first property at the time of the insurance-related event and that are now partially damaged or completely destroyed. The smart home controller may calculate a difference in the beginning values and the current values to estimate an overall value for damage caused by the insurance-related event.

The smart home controller may assign a percentage of the overall damage to each of the first and second cause of loss (block 614). To assign the percentage of damage, the smart home controller may determine whether the first cause of loss is a primary cause of loss that led to a secondary cause of loss, or that the first cause of loss is a secondary cause of loss that occurred as a result of the primary cause of loss. According to embodiments, if the first cause of loss is the primary cause of loss, then the second cause of loss is the secondary cause of loss. Similarly, if the first cause of loss is the secondary cause of loss, then the second cause of loss is the primary of loss. Returning to the flood example, the window shattering (the first cause of loss) may have led to further flooding, damaging personal property on the ground floor and basement (the second cause of loss). In this example, the window shattering may be the primary cause of loss and the subsequent flooding damage may be the secondary cause of loss.

After determining the primary and secondary causes of loss, the smart home controller may assign a portion of the overall damage to the first and second causes of loss. In some embodiments, the primary cause of loss may be assigned a larger portion of the overall damage than the secondary cause of loss. Accordingly, the smart home controller may assign, to each identified cause of loss, a percentage of the overall amount of damage. For instance, 60% of total damage to the first property may be assigned to the window shattering, with the remaining 40% of damage being assigned to the subsequent flooding damage. In some embodiments, the primary cause of loss may be assigned 100% of the overall damage.

Once the causes of loss have been identified and assigned their respective portion of damage, the smart home controller may generate an insurance claim for damage associated with the insurance-related event (block 616). Based upon the specific policies and/or coverage for the homeowner, the smart home controller may generate an appropriate proposed insurance claim. The smart home controller may further adjust the amount claimed based upon the comparison of the sequences of events.

As an example, the smart home controller may determine that the majority of other properties in the community have storm shutters that are closed in anticipation of the flood. The smart home controller may further determine that the first property also has storm shutters but failed to close them. As a result, the first property experienced significantly more damage than similar properties in the community. When generating the proposed insurance claim, the overall amount claimed may be reduced by a percentage due to the failure to mitigate damage caused by the flooding in accordance with the norms of the community. For instance, if the flooding caused $30,000 of damage, the insurance claim may only claim recovery for 60% ($18,000) of the overall damage.

Once an insurance claim is generated, the smart home controller may transmit and receive the proposed insurance claim in a manner similar to the actions performed at blocks 314-316 of the method 300 as described with reference to FIG. 3. It should be appreciated that in some embodiments, additionally or alternatively, some or all or the actions associated with blocks 602-616 may be performed by the insurance provider and/or one or more remote processors or servers associated with the insurance provider. The method 600 may include additional, fewer, or alternate actions, including those discussed elsewhere herein.

VII. EXEMPLARY USER INTERFACES

An electronic device (such as a mobile device) may provide an interface that enables a homeowner to be alerted when their property is damaged and to receive an automatically generated proposed insurance claim. The interface may be provided as part of an application that is executed on the electronic device or as a website displayable on the electronic device.

FIG. 7 illustrates an exemplary interface 700 for including a notification to a homeowner that an insurance-related event has damaged their property and, in response, enables the homeowner to file an insurance claim for the damage. As illustrated in FIG. 7, the interface 700 may provide an indication of an alert (e.g., a warning symbol) and a description of the damage to the property ("Your basement is flooded!"). The interface 700 may also provide soft buttons 710 and 720 that enable the homeowner to file an insurance claim or dismiss the notification, respectively.

FIG. 8 illustrates an exemplary interface 800 depicting a prepopulated proposed insurance claim as discussed elsewhere herein. The electronic device may present the interface 800 to the homeowner in response to receiving an indication that the homeowner wants to file an insurance claim (such as by selecting the soft button 710 as illustrated in FIG. 7). According to present embodiments, the interface 600 may include prepopulated fields indicating the homeowner's name 802 ("John Doe"), insurance account number 804 ("A102XYZ"), date of the claim 806 ("Jan. 1"), description of the cause of loss 808 ("Water entered basement via broken window"), list of damaged goods and the amount of damage 810 ("Couch—$800, TV—$1200, Treadmill—$5000"), a damage breakdown indicating the percentage of damage associated with each cause of loss 812 ("80% water, 20% wind"), and an overall claim amount 814 ("$7000").

Interface 800 may also provide soft buttons 820 and 830 that enable the homeowner to accept the proposed insurance claim as is, or to make modifications to the proposed insurance claim, respectively. In response to the homeowner selecting soft button 820, the electronic device may transmit the accepted insurance claim to the smart home controller. In response to the homeowner selecting soft button 830, the electronic device may provide another interface that allows the homeowner to modify any of the displayed fields 802-814 and/or append other information to the insurance claim.

It should be appreciated that fields 802-814 are representative of fields included in an insurance claim, in some embodiments, additional, fewer, or alternative fields may exist. Also, the exemplary user interfaces may include additional, less, or alternate functionality, including that discussed elsewhere herein.

VIII. EXEMPLARY METHODS OF IDENTIFYING CAUSES OF LOSS

In one aspect, a computer-implemented method of generating or adjusting an insurance claim may be provided. The method may include: (1) creating, via one or more processors and/or a remote server (such as processor(s) associated with a smart home controller and/or a homeowner, or remote processor(s) or remote server associated with an insurance provider), a time-sequence of events from visual and/or audio recordings acquired before, during, and/or after an insurance-related event that caused damage to a property; (2) identifying, via the processor(s) and/or remote server, two or more causes of loss from the time-sequence of events created from the visual and/or audio recordings acquired before, during, and/or after the insurance-related event; (3) estimating, via the processor(s) and/or remote server, a total amount of damage to the property caused by the insurance-related event; (4) assigning, via the processor(s) and/or remote server, (i) a percentage of the total amount of damage to the property caused by the insurance-related event to each individual cause of loss, and/or (ii) an amount of damage to the property caused by the insurance-related event to each individual cause of loss; (5) adjusting and/or generating a proposed insurance claim, via the processor(s) and/or remote server, based upon the percentage or amount of damage to the property assigned to each individual cause of loss; (6) remotely directing and/or controlling the presentation of (via the processor(s) and/or remote server), or otherwise presenting, the proposed insurance claim on a mobile device, computer, or other display for review, approval, and/or modification by a homeowner; and/or (7) receiving and/or accepting (via the processor(s) and/or remote server) an approved and/or modified insurance claim from the homeowner for processing/handling by an insurance provider (via a wireless communication or data transmission sent from the homeowner's mobile device to the processor(s) and/or remote server). The method may include additional, fewer, or alternate actions, including those discussed elsewhere herein.

In one embodiment, the first cause of loss may be water damage (e.g., damage caused by rain, waves, surge, flooding, running or flowing water, etc.) and a second cause of loss may be wind damage. For example, if the first cause of loss is water damage, the first cause of loss may lead to a second cause of loss during a weather event, wherein the second cause of loss is wind damage. Alternatively, if the first cause of loss is wind damage, and the first cause of loss may lead to a second cause of loss during the weather event, wherein the second cause of loss is water damage.

In another aspect, a computer-implemented method of generating and/or adjusting an insurance claim may be provided. The method may include: (1) automatically determining (via one or more processors and/or a remote server associated with a smart home controller, or one or more remote processors or a remote server associated with an insurance provider), based upon weather-related information, that there is a likelihood of, an insurance claim (e.g., home, personal property, auto, vehicle, boat, and/or renters insurance) due to a weather-related event; (2) remotely receiving, collecting, and/or capturing images of an insurance-related event during the weather-related event (via the processor(s) and/or remote server), the images showing an insured property and/or personal items before, during, and after the weather event; (3) determining (via the processor(s) and/or remote server) that there are two or more potential nature-related causes-of-loss (such as wind, water, surge, waves, flooding, etc.); (4) assigning (via the processor(s) and/or remote server) a percentage of the damage to the insured property and/or personal belongings to each nature-related cause-of-loss; (5) automatically generating (via the processor(s) and/or remote server) a proposed insurance claim (and/or automatically adjusting an insurance policy, premium, and/or rating) based upon the assigned percentage of the damage for each nature-related COL; (6) remotely directing and/or controlling (via the processor(s) and/or remote server) a presentation of the proposed insurance claims to the homeowner on a display screen for their review, modification, and/or approval; and/or (7) receiving and/or accepting approval of, and/or modifications to, the proposed insurance claim from the homeowner via wireless communication (sent from a mobile or other communication device associated with the homeowner to the local processor(s) and/or remote server) to facilitate initiating handling/ processing of the proposed insurance claim by the insurance provider. The method may include additional, fewer, or alternate actions, including those discussed elsewhere herein.

The first nature-related cause-of-loss may be water damage (such as caused by rain, waves, surge, flooding, free flowing water, etc.), and a second nature-related cause-of-loss may be wind damage. The first nature-related cause-of-loss (water) may lead to the second nature-related cause-of-loss (wind) during a weather event, or vice versa.

In another aspect, a computer-implemented method of generating or adjusting an insurance policy, premium, and/or claim may be provided. The method may include (a) identifying, via one or more processors and/or a remote server (such as one or more processors associated with a smart home controller, or one or more remote processors or a server associated with an insurance provider), a first cause of damage (e.g., wind, gusts, water, rain, surge, waves, flooding, thunderstorm, tornado, hurricane, fire, etc.) and/or a first exterior breach in a first section of an insured property created by a weather event; (b) identifying, via the processor(s) and/or remote server, a second cause of damage and/or a second exterior breach in a second section of the insured property created by the weather event; (c) estimating, via the processor(s) and/or remote server, a total amount of loss or damage to the insured property and/or personal belongings caused by both the first and second causes of damage; (d) assigning, via the processor(s) and/or remote server, a first portion of the total amount of loss or damage to the insured property and/or personal belongings to the first cause of damage, and a second portion of the total amount of loss or damage to the insured property and/or personal belongings to the second cause of damage; (e) adjusting, via the processor(s) and/or remote server, an insurance policy, premium, and/or claim based upon the first and/or second portion of the total amount of loss or damage to the insured property and/or personal belongings assigned to the first and/or second causes of damage; (f) directing and/or controlling the presentation of (via the processor(s) and/or remote server) the adjusted insurance policy, premium, and/or claim on a display, such as a display of a mobile device, associated with a homeowner for their review, approval, and/or modification; and/or (g) receiving and/or accepting (at the processor(s) and/or remote server via wireless communication or data transmission with the mobile device) an insurance policy, premium, and/or claim that is approved and/or modified by the homeowner for automatic and/or manual processing and/or handling by an insurance provider associated with the homeowner. The method may include additional, fewer, or alternate actions, including those discussed elsewhere herein.

The first cause of damage may be water-related, and may lead to a second cause of damage, which may be wind-related. Alternatively, the first cause of damage may be wind-related, and the first cause of damage may lead to the water-related second cause of damage. Additionally, the first and second sections of the insured property may be (1) different or separated, and/or (2) identical, or approximately or substantially identical (or the same).

In another aspect, a computer-implemented method of generating or adjusting an insurance policy, premium, and/or claim may be provided. The method may include: (i) determining, via one or more processors and/or a remote server (such as one or more processors associated with a smart home controller, or one or more remote processors or a server associated with an insurance provider), an insured property (or an area thereof) where wind and water has caused and/or entered through an exterior breach of the insured property (windows, basement, doors, roof, walls, etc.), the wind and water directly or indirectly causing damage to the insured property and/or personal property therein; (ii) analyzing, via the processor(s) and/or remote server, audio, visual and/or other data recorded before, during, and/or after a weather event caused the exterior breach of the insured property to determine whether the exterior breach was primarily, solely, or initially caused by wind or water (or if the primary, sole, or initial cause of the exterior breach was from another source); (iii) generating, adjusting, and/or updating (via the processor(s) and/or remote server), an insurance policy, premium, and/or claim based upon what (primarily, solely, or initially) caused the exterior breach to the insured property—i.e., whether the exterior breach was directly or indirectly caused by wind, water, or other causes; (iv) directing and/or controlling (via the processor(s) and/or remote server) the presentation of the insurance policy, premium, and/or claim generated, adjusted, and/or updated to a homeowner on a display (such as a display associated with a computing device and/or a mobile device) for review, approval, and/or modification; and/or (v) receiving and/or accepting (via the processor(s) and/or remote server) the approval and/or modification of the insurance policy, premium, and/or claim submitted by the homeowner (such as via wireless communication or data transmission sent from the homeowner's mobile device to the processor(s) and/or remote server) to facilitate automatically and/or manually processing the insurance policy, premium, and/or claim by the insurance provider. The method may include additional, fewer, or alternate actions, including those discussed elsewhere herein.

IX. EXEMPLARY ASSIGNMENT OF DAMAGE METHOD

In one aspect, a computer-implemented method of determining a cause of damage to a property may be provided. The property may be populated with a plurality of devices on the property and each of the plurality of devices may be configured to monitor various conditions associated with the property. The method may include (1) automatically generating, by one or more processors, a time-sequence of events for an insurance-related event based upon data recorded by the plurality of devices before, during, and/or after the insurance-related event; (2) identifying from the time-sequence of events, by the one or more processors, a first cause of loss and a second cause of loss associated with the insurance-related event; (3) analyzing, by the one or more processors, the recorded data to estimate an overall amount of damage caused by the insurance-related event; (4) based upon the time-sequence of events, assigning, by the one or more processors, (i) a first portion of the overall amount of damage to the first cause of loss and/or (ii) a second portion of the overall amount of damage to the second cause of loss; and/or (5) automatically generating, by the one or more processors, a proposed insurance claim based upon the assignment of loss. The method may include additional, less, or alternate actions, including that discussed elsewhere herein.

For instance, each of the first and second causes of loss may include at least one of water damage, wind damage, fire damage, earthquake damage, and/or a breach of structural integrity. The data recorded by the plurality of devices may include at least one of time-stamped audio data, status data, visual data captured on the property, and/or visual data captured above the property by an airborne sensor.

Assigning the first portion and the second portion may include (1) determining, by the one or more processors, whether the first cause of loss is (i) a primary cause of loss that led to a secondary cause of loss and/or (ii) a secondary cause of loss that occurred due to the primary cause of loss; and/or (2) when the first cause of loss is the primary cause of loss, assigning, by the one or more processors, (i) a larger portion of the overall amount of damage to the first cause of loss and/or (ii) a smaller portion of the overall amount of damage to the second cause of loss, and/or when the first cause of loss is the secondary cause of loss, assigning, by the one or more processors, (i) a smaller portion of the overall amount of damage to the first cause of loss and/or (ii) a larger portion of the overall amount of damage to the second cause of loss.

Each of the first portion and the second portion of the overall damage may include at least one of a percentage of the overall amount of damage to the property and/or a dollar amount of the overall amount of damage. Generating the proposed insurance claim may include prepopulating, by the one or more processors, the proposed insurance claim with the overall amount of damage, the first and second causes of loss, and/or the first and second portions of damage respectively associated with first and second causes of loss.

The method may further include (1) transmitting, via a communication network, the proposed insurance claim to an individual associated with the property; (2) receiving, via the communication network, from the individual at least one of an acceptance of the proposed insurance claim and/or a modification to the proposed insurance claim; and/or (3) verifying, by the one or more processors, that the modification to the proposed insurance claim is consistent with the time-sequence of events.

X. EXEMPLARY ASSIGNMENT OF DAMAGE SYSTEM

In one aspect, a system for determining a cause of damage to a property may be provided. The property may be populated with a plurality of devices on the property and each of the plurality of devices may be configured to monitor various conditions associated with the property. The system may include (i) a communication module adapted to communicate data; (ii) a memory adapted to store non-transitory computer executable instructions; and/or (iii) one or more processors adapted to interface with the communication module. The one or more processors may be configured to execute the non-transitory computer executable instructions to cause the one or more processors to (1) automatically generate, by the one or more processors, a time-sequence of events for an insurance-related event based upon data recorded by the plurality of devices before, during, and/or after the insurance-related event; (2) identify from the time-sequence of events, by the one or more processors, a first cause of loss and a second cause of loss associated with the insurance-related event; (3) analyze, by the one or more processors, the recorded data to estimate an overall amount of damage caused by the insurance-related event; (4) based upon the time-sequence of events, assign, by the one or more processors, (i) a first portion of the overall amount of damage to the first cause of loss and/or (ii) a second portion of the overall amount of damage to the second cause of loss; and/or (5) automatically generate, by the one or more processors, a proposed insurance claim based upon the assignment of loss. The system and processors may include additional, less, or alternate functionality, including that discussed elsewhere herein.

For instance, each of the first and second causes of loss may include at least one of water damage, wind damage, fire damage, earthquake damage, and/or a breach of structural integrity. The data recorded by the plurality of devices may include at least one of time-stamped audio data, status data, visual data captured on the property, or visual data captured above the property by an airborne sensor.

To assign the first portion and the second portion of the overall damage, the one or more processors may be further configured to execute the non-transitory computer executable instructions to cause the one or more processors to (1) determine, by the one or more processors, whether the first cause of loss is (i) a primary cause of loss that led to a secondary cause of loss and/or (ii) a secondary cause of loss that occurred due to the primary cause of loss; and/or (2) when the first cause of loss is the primary cause of loss, assign, by the one or more processors, (i) a larger portion of the overall amount of damage to the first cause of loss and/or (ii) a smaller portion of the overall amount of damage to the second cause of loss, and/or when the first cause of loss is the secondary cause of loss, assign, by the one or more processors, (i) a smaller portion of the overall amount of damage to the first cause of loss and/or (ii) a larger portion of the overall amount of damage to the second cause of loss.

Each of the first portion and the second portion of the overall damage may include at least one of a percentage of the overall amount of damage to the property and/or a dollar amount of the overall amount of damage. To generate the proposed insurance claim, the one or more processors may be further configured to execute the non-transitory computer executable instructions to cause the one or more processors to prepopulate, by the one or more processors, the proposed insurance claim with the overall amount of damage, the first and second causes of loss, and/or the first and second portions of damage respectively associated with first and second causes of loss.

The communication module may be configured to transmit the proposed insurance claim to an individual associated with the property; and/or receive from the individual at least one of an acceptance of the proposed insurance claim and/or a modification to the proposed insurance claim. The one or more processors may be further configured to execute the non-transitory computer executable instructions to cause the one or more processors to verify, by the one or more processors, that the modification to the proposed insurance claim is consistent with the time-sequence of events.

XI. EXEMPLARY COMPUTER-READABLE MEDIUM FOR ASSIGNMENT OF DAMAGE

In one aspect, a non-transitory computer-readable storage medium storing processor-executable instructions may be provided. When executed, the instructions may cause one or more processors to (1) automatically generate, by the one or more processors, a time-sequence of events for an insurance-related event based upon data recorded by the plurality of devices before, during, and/or after the insurance-related event; (2) identify from the time-sequence of events, by the one or more processors, a first cause of loss and a second cause of loss associated with the insurance-related event; (3) analyze, by the one or more processors, the recorded data to estimate an overall amount of damage caused by the insurance-related event; (4) based upon the time-sequence of events, assign, by the one or more processors, (i) a first portion of the overall amount of damage to the first cause of loss and/or (ii) a second portion of the overall amount of damage to the second cause of loss; and/or (5) automatically generate, by the one or more processors, a proposed insurance claim based upon the assignment of loss. The instructions may include additional, less, or alternate functionality, including that discussed elsewhere herein.

For instance, to assign the first portion and the second portion of the overall damage, the instructions, when executed, may further cause the one or more processors to (1) determine, by the one or more processors, whether the first cause of loss is (i) a primary cause of loss that led to a secondary cause of loss and/or (ii) a secondary cause of loss that occurred due to the primary cause of loss; and/or (2) when the first cause of loss is the primary cause of loss, assign, by the one or more processors, (i) a larger portion of the overall amount of damage to the first cause of loss and/or (ii) a smaller portion of the overall amount of damage to the second cause of loss, and/or when the first cause of loss is the secondary cause of loss, assign, by the one or more processors, (i) a smaller portion of the overall amount of damage to the first cause of loss and/or (ii) a larger portion of the overall amount of damage to the second cause of loss.

To generate the proposed insurance claim, the instructions, when executed, may cause the one or more processors to prepopulate, by the one or more processors, the proposed insurance claim with the overall amount of damage, the first and second causes of loss, and/or the first and second portions of damage respectively associated with first and second causes of loss. The instructions, when executed, may further cause the one or more processors to transmit, via a communication network, the proposed insurance claim to an individual associated with the property; and/or receive, via a communication network, from the individual at least one of an acceptance of the proposed insurance claim and/or a modification to the proposed insurance claim.

XII. EXEMPLARY SMART HOME CONTROLLER

Figure 9:
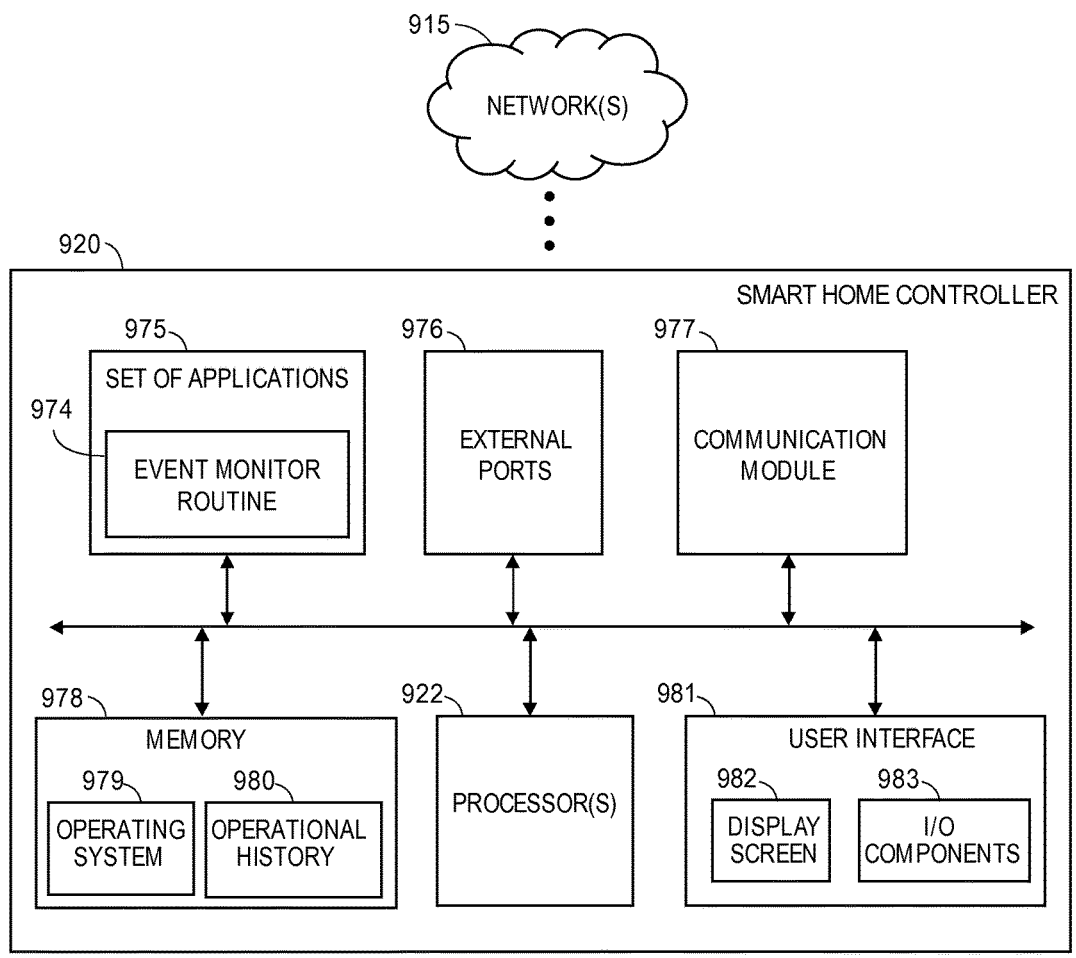
FIG. 9 is a block diagram of an exemplary smart home controller in accordance with some embodiments.

FIG. 9 illustrates a diagram of an exemplary smart home controller 920 (such as the smart home controller 120 as discussed with respect to FIG. 1) in which the functionalities as discussed herein may be implemented. It should be appreciated that the smart home controller 920 may be associated with a property, as discussed herein.

The smart home controller 920 may include a processor 922 as well as a memory 978. The memory 978 may store an operating system 979 capable of facilitating the functionalities as described herein. The smart home controller 920 may also store a set of applications 975 (i.e., machine readable instructions). For example, one of the set of applications 975 may be an event monitor routine 984 configured detect when an insurance-related event commences and terminated. It should be appreciated that other applications are envisioned.

The processor 922 may interface with the memory 978 to execute the operating system 979 and the set of applications 975. According to some embodiments, the memory 978 may also include operational history data 980 that may include time-stamped audio, visual and other data associated with detecting damage to the property. The event monitor routine 984 may access the operational history 980 to associate the data stored in the operational history memory 980 as being recorded before, during, or after an insurance-related event. The memory 978 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The smart home controller 920 may further include a communication module 977 configured to communicate data via one or more networks 915. Networks 915 may include both a local network for communicating between devices on or proximate to the property and a remote network for communicating between the property and external parties. According to some embodiments, the communication module 977 may include one or more transceivers (e.g., WWAN, WLAN, and/or WPAN transceivers) functioning in accordance with IEEE standards, 3GPP standards, or other standards, and configured to receive and transmit data via one or more external ports 976. In some embodiments, the communication module 977 may include separate transceivers configured to interact with the local and remote networks separately. The smart home controller 920 may further include a user interface 981 configured to present information to a user and/or receive inputs from the user. As shown in FIG. 9, the user interface 981 may include a display screen 982 and I/O components 983 (e.g., ports, capacitive or resistive touch sensitive input panels, keys, buttons, lights, LEDs, speakers, microphones). According to the present embodiments, the user may access the smart home controller 920 via the user interface 981 to access audio, visual, or other data associated with the property and/or perform other functions. In some embodiments, the smart home controller 920 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the processor 922 (e.g., working in connection with the operating system 979) to facilitate the functions as described herein. In this regard, the program code may be implemented in any desired language, and may be implemented as machine code, assembly code, byte code, interpretable source code or the like (e.g., via Python, C, C++, Java, Actionscript, Objective-C, Javascript, CSS, XML). In some embodiments, the computer program product may be part of a cloud network of resources.

XIII. ADDITIONAL CONSIDERATIONS

As used herein, the term "smart" may refer to devices, sensors or appliances located inside, or proximate to, a property with the ability to remotely communicate information about the status of the device, sensor, or appliance and/or receive instructions that control the operation of the device, sensor, or appliance. For example, a smart thermostat may be able to remotely communicate the current temperature of the home and receive instructions to adjust the temperature to a new level. As another example, a smart water tank may be able to remotely communicate the level water contained therein and receive instructions to restrict the flow of water leaving the tank. In contrast, "dumb" devices, sensors, or appliances located inside, or proximate to, a property require manual control. Referring again to the thermostat example, to adjust the temperature on a "dumb" thermostat, a person would have to manually interact with the thermostat. As such, a person is unable to use a communication network to remotely adjust a "dumb" device, sensor, or appliance.

For simplicity's sake, a "smart device" shall be used herein to refer to any of a smart device, sensor, appliance, and/or other smart equipment that is disposed on or proximate to a property. In embodiments in which an appliance and a sensor external to the particular appliance are associated with each other, "smart device" may refer to both the external sensors and the appliance collectively. Some examples of devices that may be "smart devices" are, without limitation, valves, piping, clothes washers/dryers, dish washers, refrigerators, sprinkler systems, toilets, showers, sinks, soil monitors, doors, locks, windows, shutters, ovens, grills, fire places, furnaces, lighting, sump pumps, security cameras, and alarm systems. Similarly, an individual associated with the property shall be referred to as the "homeowner", but it is also envisioned that the individual is a family member of the homeowner, a person renting/subletting the property, a person living or working on the property, a neighbor of the property, or any other individual that may have an interest in determining a cause of loss for damage to the property.

Further, any reference to "home" is meant to be exemplary and not limiting. The systems and methods described herein may be applied to any property, such as offices, farms, lots, parks, and/or other types of properties or buildings. Accordingly, "homeowner" may be used interchangeably with "property owner." As used herein, "property" may also refer to any buildings, belongings and/or equipment disposed on the property itself.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home or personal property insurance policies, it should be appreciated that an insurance provider may offer or provide one or more different types of insurance policies. Other types of insurance policies may include, for example, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), and other types of insurance products. In embodiments as described herein, the insurance providers process claims related to insurance policies that cover one or more properties (e.g., homes, automobiles, personal property), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of determining a cause of damage to a property populated with a plurality of smart devices on the property, each of the plurality of smart devices configured to monitor various conditions associated with the property, the method comprising:
   receiving, at a smart home controller disposed on the property, a set of sensor data from the plurality of smart devices recorded before, during, and after an insurance-related event;
   comparing, by one or more processors of the smart home controller disposed on the property, the data recorded before the insurance-related event to the data recorded during and after the insurance-related event to automatically generate a time-sequence of events for the insurance-related event;
   identifying from the time-sequence of events, by the one or more processors of the smart home controller disposed on the property, a first cause of loss and a second cause of loss associated with the insurance-related event;
   based upon the comparison, analyzing, by the one or more processors of the smart home controller disposed on the property, the set of sensor data to estimate an overall amount of damage caused by the insurance-related event;
   based upon the time-sequence of events, assigning, by the one or more processors of the smart home controller disposed on the property, (i) a first portion of the overall amount of damage to the first cause of loss and (ii) a second portion of the overall amount of damage to the second cause of loss, wherein each of the first portion and the second portion of the overall damage comprises at least one of a percentage of the overall amount of damage to the property or a dollar amount of the overall amount of damage; and
   automatically generating, by the one or more processors of the smart home controller disposed on the property, a proposed insurance claim based upon the assignment of the first portion of the overall amount of damage to the first cause of loss and the second portion of the overall amount of damage to the second cause of loss.

2. The computer-implemented method of claim 1, wherein each of the first and second causes of loss comprises at least one of:
   water damage, wind damage, fire damage, earthquake damage, or a breach of structural integrity.

3. The computer-implemented method of claim 1, wherein the data recorded by the plurality of smart devices comprises at least one of:
   time-stamped audio data, status data, visual data captured on the property, or visual data captured above the property by an airborne sensor.

4. The computer-implemented method of claim 1, wherein assigning the first portion and the second portion comprises:
   determining, by the one or more processors, whether the first cause of loss is (i) a primary cause of loss that led to a secondary cause of loss or (ii) a secondary cause of loss that occurred due to the primary cause of loss; and
   when the first cause of loss is the primary cause of loss, assigning, by the one or more processors, (i) a larger portion of the overall amount of damage to the first cause of loss and (ii) a smaller portion of the overall amount of damage to the second cause of loss, and
   when the first cause of loss is the secondary cause of loss, assigning, by the one or more processors, (i) a smaller portion of the overall amount of damage to the first cause of loss and (ii) a larger portion of the overall amount of damage to the second cause of loss.

5. The computer-implemented method of claim 1, wherein generating the proposed insurance claim comprises:
   prepopulating, by the one or more processors, the proposed insurance claim with the overall amount of damage, the first and second causes of loss, and the first and second portions of damage respectively associated with first and second causes of loss.

6. The computer-implemented method of claim 1, further comprising:
   transmitting, via a communication network, the proposed insurance claim to an individual associated with the property; and
   receiving, via the communication network, from the individual at least one of an acceptance of the proposed insurance claim or a modification to the proposed insurance claim.

7. The computer-implemented method of claim 6, further comprising:
   verifying, by the one or more processers, that the modification to the proposed insurance claim is consistent with the time-sequence of events.

8. A system for determining a cause of damage to a property populated with a plurality of smart devices on the property, each of the plurality of smart devices configured to monitor various conditions associated with the property, the system being disposed on the property and comprising:
   one or more transceivers adapted to communicate data;
   a memory adapted to store non-transitory computer executable instructions; and
   one or more processors of a smart home controller adapted to interface with the communication module, wherein the one or more processors are configured to execute the non-transitory computer executable instructions to cause the one or more processors to:
      receive, via the one or more transceivers, a set of sensor data from the plurality of smart devices recorded before, during, and after an insurance-related event;
      compare, by the one or more processors, the data recorded before the insurance-related event to the data recorded during and after the insurance-related event to automatically generate a time-sequence of events for the insurance-related event;

identify from the time-sequence of events, by the one or more processors, a first cause of loss and a second cause of loss associated with the insurance-related event;

based upon the comparison, analyze, by the one or more processors, the set of sensor data to estimate an overall amount of damage caused by the insurance-related event;

based upon the time-sequence of events, assign, by the one or more processors, (i) a first portion of the overall amount of damage to the first cause of loss and (ii) a second portion of the overall amount of damage to the second cause of loss, wherein each of the first portion and the second portion of the overall damage comprises at least one of a percentage of the overall amount of damage to the property or a dollar amount of the overall amount of damage; and automatically generate, by the one or more processors, a proposed insurance claim based upon the assignment of the first portion of the overall amount of damage to the first cause of loss and the second portion of the overall amount of damage to the second cause of loss.

9. The system of claim 8, wherein each of the first and second causes of loss comprises at least one of:
water damage, wind damage, fire damage, earthquake damage, or a breach of structural integrity.

10. The system of claim 8, wherein the data recorded by the plurality of smart devices comprises at least one of:
time-stamped audio data, status data, visual data captured on the property, or visual data captured above the property by an airborne sensor.

11. The system of claim 8, wherein to assign the first portion and the second portion of the overall damage, the one or more processors are further configured to execute the non-transitory computer executable instructions to cause the one or more processors to:
determine, by the one or more processors, whether the first cause of loss is (i) a primary cause of loss that led to a secondary cause of loss or (ii) a secondary cause of loss that occurred due to the primary cause of loss; and
when the first cause of loss is the primary cause of loss, assign, by the one or more processors, (i) a larger portion of the overall amount of damage to the first cause of loss and (ii) a smaller portion of the overall amount of damage to the second cause of loss, and
when the first cause of loss is the secondary cause of loss, assign, by the one or more processors, (i) a smaller portion of the overall amount of damage to the first cause of loss and (ii) a larger portion of the overall amount of damage to the second cause of loss.

12. The system of claim 8, wherein to generate the proposed insurance claim, the one or more processors are further configured to execute the non-transitory computer executable instructions to cause the one or more processors to:
prepopulate, by the one or more processors, the proposed insurance claim with the overall amount of damage, the first and second causes of loss, and the first and second portions of damage respectively associated with first and second causes of loss.

13. The system of claim 8, wherein the communication module is further configured to:
transmit the proposed insurance claim to an individual associated with the property; and receive from the individual at least one of an acceptance of the proposed insurance claim or a modification to the proposed insurance claim.

14. The system of claim 13, wherein the one or more processors are further configured to execute the non-transitory computer executable instructions to cause the one or more processors to:
verify, by the one or more processors, that the modification to the proposed insurance claim is consistent with the time-sequence of events.

15. A non-transitory computer-readable storage medium storing processor-executable instructions, that when executed cause one or more processors to:
receiving, at a smart home controller disposed on a property, a set of sensor data from a plurality of smart devices recorded before, during, and after an insurance-related event;

comparing, by one or more processors of the smart home controller disposed on the property, the data recorded before the insurance-related event to the data recorded during and after the insurance-related event to automatically generate, by the one or more processors of a smart home controller, a time-sequence of events for the insurance-related event;

identify from the time-sequence of events, by the one or more processors of the smart home controller disposed on the property, a first cause of loss and a second cause of loss associated with the insurance-related event;

based upon the comparison, analyze, by the one or more processors of the smart home controller disposed on the property, the set of sensor data to estimate an overall amount of damage caused by the insurance-related event;

based upon the time-sequence of events, assign, by the one or more processors of the smart home controller disposed on the property, (i) a first portion of the overall amount of damage to the first cause of loss and (ii) a second portion of the overall amount of damage to the second cause of loss, wherein each of the first portion and the second portion of the overall damage comprises at least one of a percentage of the overall amount of damage to the property or a dollar amount of the overall amount of damage; and automatically generate, by the one or more processors of the smart home controller disposed on the property, a proposed insurance claim based upon the assignment of the first portion of the overall amount of damage to the first cause of loss and the second portion of the overall amount of damage to the second cause of loss.

16. The non-transitory computer-readable storage medium of claim 15, wherein to assign the first portion and the second portion of the overall damage, the instructions, when executed, further cause the one or more processors to:
determine, by the one or more processors, whether the first cause of loss is (i) a primary cause of loss that led to a secondary cause of loss or (ii) a secondary cause of loss that occurred due to the primary cause of loss; and
when the first cause of loss is the primary cause of loss, assign, by the one or more processors, (i) a larger portion of the overall amount of damage to the first cause of loss and (ii) a smaller portion of the overall amount of damage to the second cause of loss, and
when the first cause of loss is the secondary cause of loss, assign, by the one or more processors, (i) a smaller portion of the overall amount of damage to the first cause of loss and (ii) a larger portion of the overall amount of damage to the second cause of loss.

17. The non-transitory computer-readable storage medium of claim 15, wherein to generate the proposed insurance claim, the instructions, when executed, further cause the one or more processors to:
- prepopulate, by the one or more processors, the proposed insurance claim with the overall amount of damage, the first and second causes of loss, and the first and second portions of damage respectively associated with first and second causes of loss.

18. The non-transitory computer-readable storage medium of claim 15, wherein the instructions, when executed, further cause the one or more processors to:
- transmit, via a communication network, the proposed insurance claim to an individual associated with the property; and
- receive, via a communication network, from the individual at least one of an acceptance of the proposed insurance claim or a modification to the proposed insurance claim.

\* \* \* \* \*